United States Patent
Siebert et al.

(10) Patent No.: US 12,553,090 B2
(45) Date of Patent: Feb. 17, 2026

(54) MOLECULAR PREDICTORS OF PATIENT RESPONSE TO RADIOTHERAPY TREATMENT

(71) Applicants: Siemens Healthineers AG, Forchheim (DE); The Cleveland Clinic Foundation, Cleveland, OH (US)

(72) Inventors: Matthias Siebert, Marloffstein (DE); Carsten Dietrich, Nuremberg (DE); Heike Wehner, Bamberg (DE); Jens-Christoph Georgi, Oberasbach (DE); Mohamed Abazeed, Willowbrook, IL (US); Andreas Emanuel Posch, Vienna (AT); Andreas Kappel, Glashuetten (DE); Mark Matzas, Nuremberg (DE)

(73) Assignees: The Cleveland Clinic Foundation, Cleveland, OH (US); Siemens Healthineers AG, Forchheim (DE)

( * ) Notice: Subject to any disclaimer, the term of this patent is extended or adjusted under 35 U.S.C. 154(b) by 872 days.

(21) Appl. No.: 17/634,673

(22) PCT Filed: Jul. 31, 2020

(86) PCT No.: PCT/EP2020/071658
§ 371 (c)(1),
(2) Date: Feb. 11, 2022

(87) PCT Pub. No.: WO2021/032441
PCT Pub. Date: Feb. 25, 2021

(65) Prior Publication Data
US 2022/0275460 A1    Sep. 1, 2022

(30) Foreign Application Priority Data
Aug. 16, 2019   (EP) .................................... 19192006

(51) Int. Cl.
*C12Q 1/6886*   (2018.01)
*C12Q 1/6827*   (2018.01)

(52) U.S. Cl.
CPC ......... *C12Q 1/6886* (2013.01); *C12Q 1/6827* (2013.01); *C12Q 2600/106* (2013.01); *C12Q 2600/156* (2013.01); *C12Q 2600/158* (2013.01)

(58) Field of Classification Search
CPC .. C12Q 1/6886; C12Q 1/6883; C12Q 1/6827; C12Q 2600/106; C12Q 2600/156; C12Q 2600/158
See application file for complete search history.

(56) References Cited

U.S. PATENT DOCUMENTS

2008/0166729 A1   7/2008   Kim et al.

FOREIGN PATENT DOCUMENTS

| CN | 107099586 A | 8/2017 | |
| EP | 3778924 A1 * | 2/2021 | ............. G16B 50/00 |
| WO | 2019133697 A1 | 7/2019 | |

OTHER PUBLICATIONS

A Das, M Bell, C Nirodi, M Story, J Minna. Radiogenomics Predicting Tumor Responses to Radiotherapy in Lung Cancer. 2010. Seminars in Radiation Oncology, vol. 20, Issue 3. https://doi.org/10.1016/j.semradonc.2010.01.002. (Year: 2010).*
An Y, Jin G, Wang H, et al. Polymorphisms in hMLH1 and risk of early-onset lung cancer in a southeast Chinese population. Lung Cancer. 2008;59(2):164-170. doi:10.1016/j.lungcan.2007.08.003 (Year: 2008).*
Rizvi et al., Mutational landscape determines sensitivity to PD-1 blockade in non-small cell lung cancer.Science 348, 124-128(2015). DOI:10.1126/science.aaa1348 (Year: 2015).*
Devarakonda S, Rotolo F, Tsao MS, et al. Tumor Mutation Burden as a Biomarker in Resected Non-Small-Cell Lung Cancer. J Clin Oncol. 2018;36(30):2995-3006. doi:10.1200/JCO.2018.78.1963 (Year: 2018).*
Kelsey CR, Jackson IL, Langdon S, et al. Analysis of single nucleotide polymorphisms and radiation sensitivity of the lung assessed with an objective radiologic endpoin. Clin Lung Cancer. 2013;14(3):267-274. doi:10.1016/j.cllc.2012.10.006 (Year: 2013).*
Mateusz, Florczuk et al.; "mi RNAs as Biomarkers and Therapeutic Targets in Non-Small Cell Lung Cancer: Current Perspectives", Targeted Oncology, Springer Paris, Paris, vol. 12, No. 2, pp. 179-200, XP036201139, ISSN: 1776-2596, DOI: 10.1007/S11523-017-0478-5 [retrieved on Feb. 27, 2017]; paragraph [03.2]; 2017.
Eschrich, Steven A. et.al., "A gene expression model of intrinsic tumor radiosensitivity: Prediction of response and prognosis after chemoradiation", Int J Radiat Oncol Biol Phys, 489-496, 2009, DOI:10.1016/j.ijrobp.2009.06.014.
Aerts, Hugo J. W. L. et.al., "Decoding tumour phenotype by noninvasive imaging using a quantitative radiomics approach", Nature Communications, 1-8, 2014, DOI: 10.1038/ncomms5006.
Speers, Corey et.al.; "Development and Validation of a Novel Radiosensitivity Signature in Human Breast Cancer", Clinical Cancer Research, 3667-3677, 2015, DOI: 10.1158/1078-0432.CCR-14-2898.
Scott, Jacob G. et.al., "A genome-based model for adjusting radiotherapy dose (GARD): a retrospective, cohort-based study", Lancet Oncol, 202-211, 2017.

(Continued)

*Primary Examiner* — Stephen T Kapushoc
*Assistant Examiner* — Kailey Elizabeth Cash
(74) *Attorney, Agent, or Firm* — Harness Dickey & Pierce P.L.C.

(57) ABSTRACT

Disclosed are methods of predicting a radiotherapy success in a method of treating a lung cancer of a patient, the use of specific markers for predicting a radiotherapy success in a method of treating a lung cancer of a patient, a database comprising the markers, and a computer program product for use in such a method.

4 Claims, 3 Drawing Sheets

Specification includes a Sequence Listing.

(56) References Cited

OTHER PUBLICATIONS

Chen, Xu et.al., "Plasma miRNAs in predicting radiosensitivity in non-small cell lung cancer", Tumor Biol., 11927-11936, 2016, DOI 10.1007/s13277-016-5052-8.

Kerns, Sarah L et. al.; "Radiogenomics: Using Genetics to Identify Cancer Patients at Risk for Development of Adverse Effects Following Radiotherapy", Cancer Discovery, 155-165, 2014, DOI: 10.1158/2159-8290.CD-13-0197.

Enguix-Riego Maria Del Valle et al: "The single nucleotide variant rs2868371 associates with the risk of mortality in non-small cell lung cancer patients: A multicenter prospective validation", Radiotherapy and Oncology, vol. 136, pp. 29-36, XP055671510, Ireland ISSN: 0167-8140, DOI: 10.1016/j.radonc.2019.03.025; Abstract; the whole document; 2019.

Anonymous; "rs1799977 RefSNP Report—dbSNP—NCBI", XP055671614, Retrieved from the Internet: URL:https://www.ncbi.nlm.nih.gov/snp/rs179 9977; [retrieved on Feb. 25, 2020]; the whole document; 2019.

Pernia Olga et al.; "Methylation status of IGFBP-3 as a useful clinical tool for deciding on a concomitant radiotherapy", EPIGENETICS, vol. 9, No. 11, pp. 1446-1453, XP055324576, US ISSN: 1559-2294, DOI: 10.4161/15592294.2014.971626; Abstract; the whole document; 2014.

Su et al.; "Genetic polymorphisms and treatment response in advanced non-small cellung cancer", Lung Cancer, Elsevier, Amsterdam, NL, vol. 56, No. 2, pp. 281-288, XP022034233, ISSN: 0169-5002, DOI: 10.1016/J.LUNGCAN.2006.12.002; Abstract; the whole document *; 2007.

Enguix-Riego, et al: "S77 ESTRO 37 OC-0153 Multicenter prospective validation of HSPB1 rs2868371 SNP and survival in non-small celllung cancer", XP055671506, Retrieved from the Internet: URL:https://www.thegreenjournal.com/article/S0167-8140(18)30463-8/pdf; [retrieved on Feb. 25, 2020]; Abstract, the whole document; 2018.

Zhao, Shuang G. et.al., "Development and validation of a 24-gene predictor of response to postoperative radiotherapy in prostate cancer: a matched, retrospective analysis", Lancet Oncol, 1612-1620, 2016.

Jin-Yan Liang et al.; "Clinical value of MLHI-negative circulating tumor cells in lung cancer patients:", Medicine., vol. 98, No. 25, p. e15721, XP055671623, US ISSN: 0025-7974, DOI: 10.1097/MD.0000000000015721; p. 5, col. 2, paragraph 2; Abstract; the whole document; 2019.

Ausborn Natalie L et al: "Molecular Profiling to Optimize Treatment in Non-Small Cell Lung Cancer: A Review of Potential Molecular Targets for Radiation Therapy by the Translational Research Program of the Radiation Therapy Oncology Group", International Journal of Radiation: Oncology Biology Physics, Pergamon Press, USA, vol. 83, No. 4, pp. e453-e464, XP028492512, ISSN: 0360-3016, DOI: 10.1016/J.IJROBP.2012.01.056 [retrieved on Jan. 20, 2012]; pp. e460-e461; 2012.

\* cited by examiner

MOLECULAR PREDICTORS OF PATIENT RESPONSE TO RADIOTHERAPY TREATMENT

CROSS-REFERENCE TO RELATED APPLICATION(S)

This application is the National Phase under 35 U.S.C. § 371 of International Application No. PCT/EP2020/071658, which has an international filing date of Jul. 31, 2020, and which designated the United States of America, and which claims priority to European Application No. EP 19192006.5, filed Aug. 16, 2019, the entire contents of each of which are incorporated herein by reference.

REFERENCE TO AN ELECTRONIC SEQUENCE LISTING

This application contains references to nucleic acid sequences and/or amino acid sequences which have been submitted concurrently herewith as the sequence listing TXT file entitled "eolf-seql.txt", file size 16,652,646 Bytes (B), created on 11 Feb. 2022. The aforementioned sequence listing is hereby incorporated by reference in its entirety.

FIELD

Embodiments of the present invention relate to methods of predicting a radiotherapy success in a method of treating a lung cancer of a patient, the use of specific markers for predicting a radiotherapy success in a method of treating a lung cancer of a patient, a database comprising the markers, and a computer program product for use in such a method.

BACKGROUND

The overwhelming majority (~70%) of cancer patients needs a radiation therapy at some point in the course of its treatment. There are basically three forms of radiation therapy in cancer:
External beam radiation therapy (EBRT), in particular x-ray and particle therapy
Brachytherapy (internal radiation therapy), in particular low-dose rate (LDR) and high-dose rate (HDR) brachytherapy
Targeted radiation therapy These can be combined among each other or with adjuvant therapies, such as chemotherapy, immunotherapy, and surgical therapy. Patients respond differently to radiation therapy, depending on cancer type, cancer stage, and form of therapy; with a response rate of ~50% for conventional radiotherapy. This is due in particular to the tumor tissue's inherent sensitivity or resistance to radiation. Furthermore, (irreversible) side effects can occur, depending on the radiosensitivity inherent to the healthy tissue that is located adjacent to the tumor.

To avoid ineffective therapies and (irreversible) side effects, there is a clinical need for a solution that can predict radiotherapy success. This is particularly interesting from a health economics point of view, since such a solution would reduce the patient's average length of stay in the hospital and, consequently, the associated cost. Moreover, the avoidance of inefficacious treatments with potentially adverse side effects would positively influence overall outcome and prognosis. In addition, any solution that speeds up the time of clinical decision support and that provides transparency into the decision-marking process to make it comprehensible to the clinical is desirable.

Existing products and products under development differ particularly in the following features:
Prediction of radiosensitivity/radioresistance in tumor tissue versus radiosensitivity/radiotoxicity in healthy tissue
Universal (pan-cancer) versus tissue-specific (e.g. squamous cell lung carcinoma) prediction/application
Technologies used and measured biological substance
Medical knowledge and clinical guidelines integrated Several platforms exist or are in development to determine radiosensitivity/radioresistance in tumor tissue.

The Cvergenx™ pGRT™ (precision genomic radiation therapy) platform (under development) is based on measuring the activity of ten genes (via RNA) to calculate a tumor radiosensitivity index (RSI, Eschrich et al., 2009, Int J Radiat Oncol Biol Phys, DOI: 10.1016/j.ijrobp.2009.06.014) and its integration into a model to adapt radiation dose (genomic-adjusted radiation dose, GARD, Scott et al., 2017, Lancet Oncol, DOI: 10.1016/S1470-2045(16)30648-9) in chemoradiation therapy.

The PFS Genomics™ RadiotypeDX™ test (under development) is based on measuring the activity of 51 genes (via RNA) in breast cancer tissue and predicts a locoregional recurrence after adjuvant radiotherapy (Speers et al., 2015, Clin Cancer Res, DOI: 10.1158/1078-0432.CCR-14-2898).

The Genomic Health® OncotypeDx™ test is based on measuring the activity of 21 genes (via RNA) in breast cancer tissue (in particular ductal carcinoma in situ, DCIS) and predicts radiotherapy success as well as locoregional recurrence after radiotherapy.

The GenomeDx® Decipher™ test is based on measuring the activity of 22 and 24 genes (via RNA) in prostate cancer tissue and predicts the development of distal metastases after radical prostatectomy and post-operative radiotherapy (post-operative radiation therapy outcomes score, PORTOS, Zhao et al., 2016, Lancet Oncol, under development, DOI: 10.1016/S1470-2045(16)30491-0), respectively.

The OncoRadiomics™ RadiomiX™ platform is based on calculating general, quantitative tumor features from medical CT images and predicts radiotherapy success, among other things (Aerts et al, 2014, Nat Commun, DOI: 10.1038/ncomms5006).

Also, several approaches exist regarding the determination of radiotoxicity in healthy tissue.

The NovaGray® RILA Breast™ test is based on measuring apoptotic T-lymphocytes, induced by in vitro radiation of a blood sample (radiation-induced T-lymphocyte apoptosis, RILA), and identifies patients who likely respond hypersensitive to ionizing radiation and, therefore, are at risk of developing irreversible side effects, in particular fibrosis, in healthy breast tissue.

The DiaCarta® RadTox® test (under development) is based on measuring circulating, cell-free DNA (cfDNA) in blood, particularly the repetitive Alu sequence, as a measure of radiotherapy-induced tissue damage, and monitors potentially toxic side effects in healthy tissue, located adjacent to the tumor, after radiotherapy.

However, there remains a need for efficient markers for predicting a radiotherapy success in a method of treating a lung cancer of a patient.

SUMMARY

The inventors have found efficient markers for predicting radiotherapy success in patients suffering from a lung cancer.

In a first aspect, embodiments of the present invention relate to a method of predicting a radiotherapy success in a method of treating a lung cancer of a patient, comprising:
  obtaining or providing a sample of the patient, and
  determining a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB).

Further disclosed is in a second aspect the use of a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB), particularly a change in the nucleotide sequence chosen from rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, rs10425763, rs20551, rs72846670, rs73979902, rs16906255, and/or rs73144285, further particularly rs1799977 and/or rs20551, as disclosed in the Single Nucleotide Polymorphism Database dbSNP of the National Center for Biotechnology Information (NCBI), as a marker for predicting a radiotherapy success in a method of treating a lung cancer of a patient.

Embodiments of the present invention furthermore is directed in a third aspect to a database comprising the above markers of the second aspect.

A fourth aspect relates to a method of predicting a radiotherapy success in a method of treating a lung cancer of a patient, comprising:
  obtaining nucleotide sequence data and/or epigenomics profile data and/or expression profile data and/or copy number data of a sample of a patient, and
  determining the presence of at least one marker of the second aspect.

A fifth aspect is directed to a computer program product comprising computer executable instructions which, when executed, perform the method of the fourth aspect.

In a sixth aspect, a method of predicting a radiotherapy success in a method of treating a lung cancer of a patient is disclosed, comprising:
  obtaining nucleotide sequence data and/or epigenomics profile data and/or expression profile data and/or copy number data of a sample of a patient, and
  analyzing the nucleotide sequence data using the computer program product the fifth aspect.

Further aspects and embodiments of the present invention are dis-closed in the dependent claims and can be taken from the following description, figures and examples, without being limited thereto.

BRIEF DESCRIPTION OF THE DRAWINGS

The enclosed drawings should illustrate embodiments of the present invention and convey a further understanding thereof. In connection with the description they serve as explanation of concepts and principles of the present invention. Other embodiments and many of the stated advantages can be derived in relation to the drawings. The elements of the drawings are not necessarily to scale towards each other. Identical, functionally equivalent and acting equal features and components are denoted in the figures of the drawings with the same reference numbers, unless noted otherwise.

DETAILED DESCRIPTION

Figure 1:
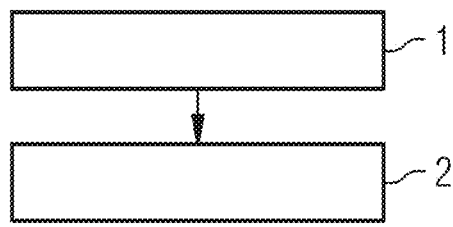
FIG. 1 shows schematically steps in a method of the first aspect of embodiments of the present invention.

Unless defined otherwise, technical and scientific terms used herein have the same meaning as commonly understood by one of ordinary skill in the art to which this embodiments of the present invention belong.

In general, a gene is a sequence of nucleotides (nucleotide sequence) in DNA—which can be copied to RNA, e.g. mRNA—or RNA, i.e. nucleic acid molecules, coding for a molecule that has a function in an organism. The term "nucleic acid molecule" refers to a polynucleotide molecule having a defined sequence. It comprises DNA molecules, RNA molecules, nucleotide analog molecules and combinations and derivatives thereof, such as DNA molecules or RNA molecules with incorporated nucleotide analogs or cDNA.

With regard to embodiments of the present invention, the following genes have the following sequence ID NO: as reference gene, as per the attached sequence protocol:
  SEQ ID NO: 1—MLH1; SEQ ID NO: 2—EP300;
  SEQ ID NO: 3—BRCA2; SEQ ID NO: 4—FLT1;
  SEQ ID NO: 5—GRINA; SEQ ID NO: 6—HEATR1;
  SEQ ID NO: 7—MUTYH; SEQ ID NO: 8—NUDT1;
  SEQ ID NO: 9—PARP10; SEQ ID NO: 10—PRPF19;
  SEQ ID NO: 11—KCNJ12; SEQ ID NO: 12—MGMT;
  SEQ ID NO: 13—PMS2P9; SEQ ID NO: 14—DDX11;
  SEQ ID NO: 15—EPHA2; SEQ ID NO: 16—GEN1;
  SEQ ID NO: 17—SETD2; SEQ ID NO: 18—ZNF208;
  SEQ ID NO: 19—APOLD1; SEQ ID NO: 20—GPER1;
  SEQ ID NO: 21—POLB; SEQ ID NO: 22—ANKRD30A;
  SEQ ID NO: 23—AR; SEQ ID NO: 24—BTK;
  SEQ ID NO: 25—GTF2H4; SEQ ID NO: 26—IKBKE;
  SEQ ID NO: 27—KAT6A; SEQ ID NO: 28—NUDT19;
  SEQ ID NO: 29—PARP1; SEQ ID NO: 30—PTPRT;
  SEQ ID NO: 31—TAF3; SEQ ID NO: 32—TDG;
  SEQ ID NO: 33—MAP3K1; SEQ ID NO: 34—SLC9A4;
  SEQ ID NO: 35—UNG; SEQ ID NO: 36—SMUG1;
  SEQ ID NO: 37—MBD4; SEQ ID NO: 38—OGG1;
  SEQ ID NO: 39—NTHL1; SEQ ID NO: 40—MPG;
  SEQ ID NO: 41—NEIL1; SEQ ID NO: 42—NEIL2;
  SEQ ID NO: 43—NEIL3; SEQ ID NO: 44—APEX1;

SEQ ID NO: 45—APEX2; SEQ ID NO: 46—LIG3;
SEQ ID NO: 47—XRCC1; SEQ ID NO: 48—PNKP;
SEQ ID NO: 49—APLF; SEQ ID NO: 50—PARP2;
SEQ ID NO: 51—PARP3; SEQ ID NO: 52—ALKBH2;
SEQ ID NO: 53—ALKBH3; SEQ ID NO: 54—TDP1;
SEQ ID NO: 55—TDP2; SEQ ID NO: 56—MSH2;
SEQ ID NO: 57—MSH3; SEQ ID NO: 58—MSH6;
SEQ ID NO: 59—PMS2; SEQ ID NO: 60—MSH4;
SEQ ID NO: 61—MSH5; SEQ ID NO: 62—MLH3;
SEQ ID NO: 63—PMS1; SEQ ID NO: 64—PMS2P3;
SEQ ID NO: 65—XPC; SEQ ID NO: 66—RAD23B;
SEQ ID NO: 67—CETN2; SEQ ID NO: 68—RAD23A;
SEQ ID NO: 69—XPA; SEQ ID NO: 70—DDB1;
SEQ ID NO: 71—DDB2; SEQ ID NO: 72—RPA1;
SEQ ID NO: 73—RPA2; SEQ ID NO: 74—RPA3;
SEQ ID NO: 75—ERCC3; SEQ ID NO: 76—ERCC2;
SEQ ID NO: 77—GTF2H1; SEQ ID NO: 78—GTF2H2;
SEQ ID NO: 79—GTF2H3; SEQ ID NO: 80—GTF2H5;
SEQ ID NO: 81—CDK7; SEQ ID NO: 82—CCNH;
SEQ ID NO: 83—MNAT1; SEQ ID NO: 84—ERCC5;
SEQ ID NO: 85—ERCC1; SEQ ID NO: 86—ERCC4;
SEQ ID NO: 87—LIG1; SEQ ID NO: 88—ERCC8;
SEQ ID NO: 89—ERCC6; SEQ ID NO: 90—UVSSA;
SEQ ID NO: 91—XAB2; SEQ ID NO: 92—MMS19;
SEQ ID NO: 93—RAD51; SEQ ID NO: 94—RAD51B;
SEQ ID NO: 95—RAD51D; SEQ ID NO: 96—DMC1;
SEQ ID NO: 97—XRCC2; SEQ ID NO: 98—XRCC3;
SEQ ID NO: 99—RAD52; SEQ ID NO: 100—RAD54L;
SEQ ID NO: 101—RAD54B; SEQ ID NO: 102—BRCA1;
SEQ ID NO: 103—SHFM1; SEQ ID NO: 104—RAD50;
SEQ ID NO: 105—MRE11A; SEQ ID NO: 106—NBN;
SEQ ID NO: 107—RBBP8; SEQ ID NO: 108—MUS81;
SEQ ID NO: 109—EME1; SEQ ID NO: 110—EME2;
SEQ ID NO: 111—SLX1A; SEQ ID NO: 112—SLX1B;
SEQ ID NO: 113—FANCA; SEQ ID NO: 114—FANCB;
SEQ ID NO: 115—FANCC; SEQ ID NO: 116—FANCD2;
SEQ ID NO: 117—FANCE; SEQ ID NO: 118—FANCF;
SEQ ID NO: 119—FANCG; SEQ ID NO: 120—FANCI;
SEQ ID NO: 121—BRIP1; SEQ ID NO: 122—FANCL;
SEQ ID NO: 123—FANCM; SEQ ID NO: 124—PALB2;
SEQ ID NO: 125—RAD51C; SEQ ID NO: 126—SLX4;
SEQ ID NO: 127—FAAP20; SEQ ID NO: 128—FAAP24;
SEQ ID NO: 129—XRCC6; SEQ ID NO: 130—XRCC5;
SEQ ID NO: 131—PRKDC; SEQ ID NO: 132—LIG4;
SEQ ID NO: 133—XRCC4; SEQ ID NO: 134—DCLRE1C;
SEQ ID NO: 135—NHEJ1; SEQ ID NO: 136—DUT;
SEQ ID NO: 137—RRM2B; SEQ ID NO: 138—POLG;
SEQ ID NO: 139—POLD1; SEQ ID NO: 140—POLE;
SEQ ID NO: 141—PCNA; SEQ ID NO: 142—REV3L;
SEQ ID NO: 143—MAD2L2; SEQ ID NO: 144—REV1;
SEQ ID NO: 145—POLH; SEQ ID NO: 146—POLI;
SEQ ID NO: 147—POLQ; SEQ ID NO: 148—POLK;
SEQ ID NO: 149—POLL; SEQ ID NO: 150—POLM;
SEQ ID NO: 151—POLN; SEQ ID NO: 152—FEN1;
SEQ ID NO: 153—FAN1; SEQ ID NO: 154—TREX1;
SEQ ID NO: 155—TREX2; SEQ ID NO: 156—EX01;
SEQ ID NO: 157—APTX; SEQ ID NO: 158—SPO11;
SEQ ID NO: 159—ENDOV; SEQ ID NO: 160—UBE2A;
SEQ ID NO: 161—UBE2B; SEQ ID NO: 162—RAD18;
SEQ ID NO: 163—SHPRH; SEQ ID NO: 164—HLTF;
SEQ ID NO: 165—RNF168; SEQ ID NO: 166—SPRTN;
SEQ ID NO: 167—RNF8; SEQ ID NO: 168—UBE2V2;
SEQ ID NO: 169—UBE2N; SEQ ID NO: 170—H2AFX;
SEQ ID NO: 171—CHAF1A; SEQ ID NO: 172—SETMAR;
SEQ ID NO: 173—BLM; SEQ ID NO: 174—WRN;
SEQ ID NO: 175—RECQL4; SEQ ID NO: 176—ATM;
SEQ ID NO: 177—MPLKIP; SEQ ID NO: 178—DCLRE1A;
SEQ ID NO: 179—DCLRE1B; SEQ ID NO: 180—RPA4;
SEQ ID NO: 181—RECQL; SEQ ID NO: 182—RECQL5;
SEQ ID NO: 183—HELQ; SEQ ID NO: 184—RDM1;
SEQ ID NO: 185—NABP2; SEQ ID NO: 186—ATR;
SEQ ID NO: 187—ATRIP; SEQ ID NO: 188—MDC1;
SEQ ID NO: 189—RAD1; SEQ ID NO: 190—RAD9A;
SEQ ID NO: 191—HUS1; SEQ ID NO: 192—RAD17;
SEQ ID NO: 193—CHEK1; SEQ ID NO: 194—CHEK2;
SEQ ID NO: 195—TP53; SEQ ID NO: 196—TP53BP1;
SEQ ID NO: 197—RIF1; SEQ ID NO: 198—TOPBP1;
SEQ ID NO: 199—CLK2; SEQ ID NO: 200—PER1;
SEQ ID NO: 201—RNF4

A change in the nucleotide sequence relates to a variation in the sequence as compared to a reference sequence. A change in the nucleotide sequence is for example a deletion of one or multiple nucleotides, an insertion of one or multiple nucleotides, a substitution of one or multiple nucleotides, a duplication of one or a sequence of multiple nucleotides, a translocation of one or a sequence of multiple nucleotides, etc. Thus, it also encompasses single-nucleotide variants (SNVs) and multi-nucleotide variants (MNVs).

An epigenomics profile corresponds to the multitude of all epigenomic modifications, i.e. DNA methylation, DNA hydroxymethylation, histone modification, etc., that can occur in a patient.

An expression profile corresponds to the quantity and/or activity of all molecules that are expressed or realized from a gene, i.e. mRNAs, proteins, etc., including the multitude of its modifications, i.e. RNA methylation, protein phosphorylation, etc., that can occur in a patient.

A copy number corresponds to the number of copies of any defined DNA region within the genome. In the diploid human genome, e.g., the characteristic copy number of any gene is two. Deviations from this copy number can occur in a patient as a result of structural sequence variations. These deviations are herein also termed copy number variations (CNVs) and are herein also termed change in copy number.

In the context of embodiments of the present invention, a "sample" is a sample which comprises at least nucleotide sequence and/or epigenetic profile and/or expression profile and/or copy number information of a patient. Examples for samples are cells, tissue, biopsy specimens, body fluids, blood, urine, saliva, sputum, plasma, serum, cell culture supernatant, swab sample and others, e.g. tumor tissue. According to certain embodiments the sample is a blood sample. In this regard it was found that the mutations particularly are not somatic, so that also blood samples, e.g. peripheral blood, are possible as samples. Peripheral blood in this regard refers to the circulating pool of blood within the patient. According to certain embodiments the sample is a tissue or a biopsy specimen which can be fixated or not, wherein a fixation can be e.g. carried out by freezing or usual fixation methods like for formalin-fixed paraffin-embedded (FFPE) tissue.

According to certain embodiments, the patient in the present methods is a vertebrate, more preferably a mammal and most preferred a human.

A vertebrate within embodiments of the present invention refers to animals having a vertebrae, which includes mammals—including humans, birds, reptiles, amphibians and fishes. Embodiments of the present invention thus are not only suitable for human medicine, but also for veterinary medicine.

The gene mutational burden (GMB) is a biomarker that measures the mutational burden in a gene by counting the number of considered mutations and e.g. provides a proxy for the remaining functionality of the gene. This metric can e.g. be used to classify genes into classes with low, medium, and high mutational burdens. The mutational burden is either a natural number (including 0) or a positive rational number (e.g. relative to 1 kbp). The number of the GMB can be entered into calculations for evaluating the probability of a radiotherapy success in a method of treating a lung cancer of a patient. The gene mutational burden in one gene can e.g. differ between patients that do and patients that do not respond to radiotherapy. It is not excluded that patients that do respond differ from patients that do not respond to radiotherapy by one or more specific mutations in a single gene, but do not show a difference in the overall mutational burden of the gene.

The tumor mutational burden (TMB) is a biomarker that measures the mutational burden in all or a subset of all genes by counting the number of considered mutations and e.g. approximates the number of mutations present in a tumor of a cancer patient. This metric can e.g. be used to classify tumors into classes with low, medium, and high mutational burdens. The tumor mutational burden is either a natural number (including 0) or a positive rational number (e.g. relative to 1 kbp). The number of the TMB can be entered into calculations for evaluating the probability of a radiotherapy success in a method of treating a lung cancer of a patient. The tumor mutational burden can e.g. differ between patients that do and patients that do not respond to radiotherapy.

Radiotherapy success can be based on a combination of somatic features/mutations (e.g. radiosensitivity/radioresistance of cancerous tissue) and germline features/mutations (innate radiosensitivity/radioresistance).

According to certain embodiments, a success in radiotherapy with adjuvant therapies, particularly chemotherapy, immunotherapy, and/or surgical therapy, is predicted in the present methods of treating a lung cancer of a patient.

In embodiments of the present invention the radiotherapy method is not particularly restricted. According to certain embodiments, the radiotherapy is external beam radiation therapy (EBRT), in particular x-ray and particle therapy, brachytherapy (internal radiation therapy), in particular low-dose rate (LDR) and high-dose rate (HDR) brachytherapy, or targeted radiation therapy. It is also not excluded that adjuvant therapies are included. According to certain embodiments the radiotherapy method thus also can be radiochemotherapy.

According to certain embodiments, the prediction of radiotherapy success includes a prediction of locoregional response and/or recurrence.

Gene coordinates can be obtained from the following resource: ftp.ncbi.nlm.nih.gov/genomes/all/GCF/000/001/405/GCF_000001405.33_GRCh38.p7/GCF_000001405.33_GRCh38.p7_feature_table.txt.gz.

Before embodiments of the present invention are described in exemplary detail, it is to be understood that the present invention is not limited to the particular component parts of the process steps of the methods described herein as such methods may vary. It is also to be understood that the terminology used herein is for purposes of describing particular embodiments only, and is not intended to be limiting.

It must be noted that, as used in the specification and the appended claims, the singular forms "a,", "an" and "the" include singular and/or plural referents unless the context clearly dictates otherwise. For example, the term "a" as used herein can be understood as one single entity or in the meaning of "one or more" entities. It is also to be understood that plural forms include singular and/or plural referents unless the context clearly dictates otherwise. It is moreover to be understood that, in case parameter ranges are given which are delimited by numeric values, the ranges are deemed to include these limitation values.

In a first aspect, at least one embodiment of the present invention relate to a method of predicting a radiotherapy success in a method of treating a lung cancer of a patient, comprising:

obtaining or providing a sample of the patient, and determining a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB).

According to certain embodiments, the present invention relates to a method of predicting a radiotherapy success in a method of treating a lung cancer of a patient, comprising:

obtaining or providing a sample of the patient, and determining a change in the nucleotide sequence and/or epigenomics profile and/or expression profile and/or copy number compared to a reference sequence and/or epigenomics profile and/or expression profile and/or copy number of at least one gene selected from MLH1, EP300, HEATR1, NUDT1, and MGMT, and/or a gene mutational burden in at least one gene selected from the group consisting of MLH1, DDX11, PRPF19, BTK, GTF2H4, KAT6A, TDG, MAP3K1, and SLC9A4, and/or a tumor mutational burden (TMB), particularly a change in the nucleotide sequence and/or epigenomics profile and/or expression profile and/or copy number compared to a reference sequence and/or epigenomics profile and/or expression profile and/or copy number of at least one gene selected from MLH1 and EP300, and/or a gene mutational burden in MLH1, and/or a tumor mutational burden (TMB).

The present method is especially suitable for predicting a radiotherapy success in a method of treating a lung cancer of a patient, particularly in a method of treating a non-small cell lung cancer (NSCLC), and further particularly in a method of treating lung squamous cell carcinoma (LUSC) and/or lung adenocarcinoma (LUAD).

In the present method the obtaining or providing of a sample of the patient is not particularly restricted but is preferably non-invasive, e.g. the sample can be taken from a stock or a storage, be obtained in vitro, etc.

Also the determining of a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB) is not particularly restricted.

For the determining of a change in the nucleotide sequence and/or epigenomics profile and/or expression profile and/or copy number compared to a reference sequence and/or epigenomics profile and/or expression profile and/or copy number, it is e.g. possible to obtain nucleotide sequence information of one or more nucleotide sequences of MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or an epigenomics profile for one or more genes of MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or an expression profile for one or more genes of MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or determine a copy number of one or more genes of MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, in the sample by a suitable method, which is not particularly restricted.

For example, nucleotide sequence information can be obtained by DNA sequencing methods that are not particularly restricted, e.g. Sanger sequencing methods, shotgun sequencing methods, bridge PCR methods, and next-generation sequencing methods.

The methods of sequencing nucleic acids referred to as next-generation sequencing have opened the possibility of large-scale genomic analysis. The term "next-generation sequencing" or "high-throughput sequencing" refers to high-throughput sequencing technologies that parallelize the sequencing process, producing thousands or millions of sequences at once. Examples include Massively Parallel Signature Sequencing (MPSS), Polony sequencing, 454 pyrosequencing, Illumina® (Solexa™) sequencing, SOLiD sequencing, Ion Torrent semiconductor sequencing, DNA nanoball sequencing, Helioscope™ single molecule sequencing, Single Molecule Real Time (SMRT) sequencing, Nanopore DNA sequencing, and RNA Polymerase (RNAP) sequencing, each with or without prior employment of target enrichment techniques like hybridization capture.

An epigenomics profile can be obtained based on specific epigenetic modifications that are not specifically restricted, e.g. histone modification assays like ChIP-Chip and ChIP-Seq and DNA methylation assays based on microarray or bead array, bisulfite sequencing, or mass spectrometry.

The expression profile of genes can either be determined on the level of RNAs, e.g. using quantitative real-time PCR, DNA microarray, or RNA sequencing methods, or on the level of proteins, e.g. using quantitative proteomics methods.

The copy number and copy number variations/changes can e.g. be determined by comparative genomic hybridizations to microarrays or next-generation sequencing methods.

After the determination, the nucleotide sequence and/or epigenomics profile and/or expression profile and/or copy number of the one or more gene can then be compared to the respective reference, i.e. the reference sequence, reference epigenomics profile, reference expression profile and reference copy number. By comparison, a change in the nucleotide sequence and/or epigenomics profile and/or expression profile and/or copy number can then be determined.

However, it is not excluded that the respective information about the nucleotide sequence and/or epigenomics profile and/or expression profile and/or copy number of the one or more gene is already provided together with the sample of the patient, so that e.g. only the comparing to a reference has to be carried out.

In embodiments of the present invention a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB) can be indicative of an enhanced or a reduced radiotherapy success in a method of treating a lung cancer of a patient. This means that a certain change in the nucleotide sequence and/or epigenomics profile and/or expression profile and/or copy number compared to a reference sequence and/or epigenomics profile and/or expression profile and/or copy number of one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB) can be indicative of an enhanced radiotherapy success in a method of treating a lung cancer of a patient, while another change in the nucleotide sequence and/or epigenomics profile and/or expression profile and/or copy number compared to a reference sequence and/or epigenomics profile and/or expression profile and/or copy number of a different gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in a different gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, can be indicative of a reduced radiotherapy success in a method of treating a lung cancer of a patient.

For example, it was found that LUSC patients with higher TMB show a better local response to radiotherapy compared to LUSC patients with lower TMB. However, better results are obtained when combinations of features, particularly with the TMB as one feature, are considered, i.e. at least one of the changes in the nucleotide sequence and/or epigenomics profile and/or expression profile and/or copy number compared to a reference sequence and/or epigenomics profile and/or expression profile and/or copy number of the genes mentioned for the present methods, and/or at least one GMB for the genes mentioned for the present methods.

According to certain embodiments the lung cancer is a non-small cell lung cancer, wherein the change in the nucleotide sequence and/or epigenomics profile and/or expression profile and/or copy number compared to a reference sequence and/or epigenomics profile and/or expression profile and/or copy number, particularly a change in the nucleotide sequence compared to a reference sequence, is determined in at least one gene selected from the group consisting of BRCA2, DDX11, EPHA2, FLT1, GEN1, GRINA, HEATR1, MLH1, MUTYH, NUDT1, PARP10, PRPF19, SETD2, ZNF208, EP300, KCNJ12, MGMT, and PMS2P9, particularly MLH1 and/or EP300, and/or wherein the gene mutational burden is determined in at least one gene selected from the group consisting of APOLD1, DDX11, GEN1, GPER1, MLH1, POLB, PRPF19, ANKRD30A, AR, BTK, GTF2H4, HEATR1, IKBKE, KAT6A, MAP3K1, NUDT19, PARP1, PTPRT, SLC9A4, TAF3, and TDG, particularly MLH1, and/or wherein the tumor mutational burden is determined, preferably wherein a change in the nucleotide sequence and/or epigenomics profile and/or expression profile and/or copy number compared to a reference sequence and/or epigenomics profile and/or expression profile and/or copy number, particularly a change in the nucleotide sequence compared to a reference sequence, of at least one gene selected from MLH1, EP300, HEATR1, NUDT1, and MGMT, and/or a gene mutational burden in at least one gene selected from the group consisting of MLH1, DDX11, PRPF19, BTK, GTF2H4, KAT6A, TDG, MAP3K1, and SLC9A4, and/or a tumor mutational burden (TMB) is determined, further preferably wherein a change in the nucleotide sequence and/or epigenomics profile and/or expression profile and/or copy number compared to a reference sequence and/or epigenomics profile and/or expression profile and/or copy number, particularly a change in the nucleotide sequence compared to a reference sequence, of at least one gene selected from MLH1 and EP300, and/or a gene mutational burden in MLH1, and/or a tumor mutational burden (TMB) is determined.

According to certain embodiments at least one change in the nucleotide sequence is determined chosen from rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, rs10425763, rs20551, rs72846670, rs73979902, rs16906255, and rs73144285, as disclosed in the Single Nucleotide Polymorphism Database dbSNP of the National Center for Biotechnology Information (NCBI), and/or NC_000007.14: g.77040016_77040017delinsCA, as compiled to the Human Genome Variation Society (HGVS; www.hgvs.org/) variant nomenclature, preferably rs1885534, rs2794763, rs1799977, rs1062492, rs20551, rs16906255, particularly rs1799977 and/or rs20551, as disclosed in the Single Nucleotide Polymorphism Database dbSNP of the National Center for Biotechnology Information (NCBI).

The changes as disclosed in the Single Nucleotide Polymorphism Database dbSNP of the National Center for Biotechnology Information (NCBI) are thereby as follows (for *Homo sapiens*):

rs1801406: position: chr13:32337751 (GRCh38.p12, obtained from NCBI) (position 22272 in SEQ ID NO: 3, BRCA2); alleles: A>C (missense variant), A>G (synonymous variant); variation Type: Single Nucleotide Variation (SNV); gene: BRCA2 rs1046456: position: chr12:31101061 (GRCh38.p12) (position 27488 in SEQ ID NO: 14, DDX11); alleles: C>T; variation Type: SNV; gene: DDX11, synonymous or missense variant rs3754334: position: chr1:16125272 (GRCh38.p12) (position 936 in SEQ ID NO: 14, EPHA2); alleles: G>A; variation Type: SNV; gene: EPHA2, synonymous variant rs7993418: position: chr13:28308924 (GRCh38.p12) (position 8579 in SEQ ID NO: 4, FLT1); alleles: G>A; variation Type: SNV; gene: FLT1, synonymous variant rs16981869: position: chr2:17764976 (GRCh38.p12) (position 11290 in SEQ ID NO: 16, GEN1); alleles: A>G; variation Type: SNV; gene: GEN1, missense variant rs72407975: position: chr2:17768673:17768675 (GRCh38.p7) (positions 14987:14989 in SEQ ID NO: 16, GEN1); alleles: TAA/-; variation Type: Insertion and Deletion (Indel); gene: GEN1, intron variant rs67714660: chr8:143991836 (GRCh38.p12) (position 1779 in SEQ ID NO: 5, GRINA); alleles: C>A, C>G; variation Type: SNV; gene: GRINA, intron variant rs56261297: chr8:143992685 (GRCh38.p12) (position 2628 in SEQ ID NO: 5, GRINA); alleles: C>T; variation Type: SNV; gene: GRINA, intron variant rs2275685: chr1:236553659 (GRCh38.p12) (position 4655 in SEQ ID NO: 6, HEATR1); alleles: C>T; variation Type: SNV; gene: HEATR1, synonymous variant rs2275687: chr1:236554626 (GRCh38.p12) (position 5622 in SEQ ID NO: 6, HEATR1); alleles: T>C; variation Type: SNV; gene: HEATR1, missense variant rs1885533: chr:1236555893 (GRCh38.p12) (position 6889 in SEQ ID NO: 6, HEATR1); alleles: A>C, A>G, A>T; variation Type: SNV; gene: HEATR1, missense variant rs1885534: chr:1236555959 (GRCh38.p12) (position 6955 in SEQ ID NO: 6, HEATR1); alleles: G>A; variation Type: SNV; gene: HEATR1, intron variant rs1006456: chr:1236585205 (GRCh38.p12) (position 36201 in SEQ ID NO: 6, HEATR1); alleles: T>C; variation Type: SNV; gene: HEATR1, synonymous variant rs2794763: chr:1236586349 (GRCh38.p12) (position 37345 in SEQ ID NO: 6, HEATR1); alleles: T>C; variation Type: SNV; gene: HEATR1, missense variant rs1799977: chr3:37012077 (GRCh38.p12) (position 18728 in SEQ ID NO: 1, MLH1); alleles: A>C, A>G, A>T; variation Type: SNV; gene: MLH1, missense variant rs3219472: chr:145338378 (GRCh38.p12) (position 9137 in SEQ ID NO: 7, MUTYH); alleles: C>T; variation Type: SNV; gene: MUTYH, intron variant rs1062492: chr7:2251050 (GRCh38.p12) (position 8829 in SEQ ID NO: 8, NUDT1); alleles: C>T; variation Type: SNV; gene: NUDT1, 3'UTR variant rs11136344: chr8:143985257 (GRCh38.p12) (position 8106 in SEQ ID NO: 9, PARP10); alleles: T>C; variation Type: SNV; gene: PARP10, missense variant rs11136345: chr8:143985944 (GRCh38.p12) (position 8793 in SEQ ID NO: 9, PARP10); alleles: G>A (synonymous variant), G>C (missense variant); variation Type: SNV; gene: PARP10 rs2240045: chr11:60903374 (GRCh38.p12) (position 12828 in SEQ ID NO: 10, PRPF19); alleles: C>T; variation Type: SNV; gene: PRPF19, intron variant rs4082155: chr3:47083895 (GRCh38.p12) (position 67488 in SEQ ID NO: 17, SETD2); alleles: G>A, G>T; variation Type: SNV; gene: SETD2, missense variant rs10425763: chr19:21973116 (GRCh38.p12) (position 7022 in SEQ ID NO: 18, ZNF208); alleles: T>C; variation Type: SNV; gene: ZNF208, missense variant rs20551: chr22:41152004 (GRCh38.p12) (position 59395 in SEQ ID NO: 2, EP300); alleles: A>G; variation Type: SNV; gene: EP300, missense variant rs72846670: chr17:21416533 (GRCh38.p12) (position 40147 in SEQ ID NO: 11, KCNJ12); alleles: C>G (missense variant), C>T (synonymous variant); variation Type: SNV; gene: KCNJ12 rs73979902: chr17:21416556 (GRCh38.p12) (position 40170 in SEQ ID NO: 11, KCNJ12); alleles: G>A, G>T; variation Type: SNV; gene: KCNJ12, missense variant rs16906255: chr10:129467401 (GRCh38.p12) (position 218 in SEQ ID NO: 12, MGMT); alleles: T>G; variation Type: SNV; gene: MGMT, intron variant rs73144285: chr7:77040017 (GRCh38.p12) (NC_000007.14:g.77040016_77040017delinsCA, position 77040016 in chromosome 7 corresponds to position 537 in SEQ ID NO: 13, PMS2P9; alleles: G>A, G>T; variation Type: SNV; gene: PMS2P9, non-coding transcript variant According to certain embodiments, the present invention relates to a method of predicting a radiotherapy success in a method of treating a lung cancer of a patient, comprising:
obtaining or providing a sample of the patient, and
determining at least one change in the nucleotide sequence chosen from rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, rs10425763, rs20551, rs72846670, rs73979902, rs16906255, and rs73144285, preferably rs1885534, rs2794763, rs1799977, rs1062492, rs20551, rs16906255, particularly rs1799977 and/or rs20551, as disclosed in the Single Nucleotide Polymorphism Database dbSNP of the National Center for Biotechnology Information (NCBI), and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB).

According to certain embodiments, the present invention relates to a method of predicting a radiotherapy success in a method of treating a lung cancer of a patient, comprising:
obtaining or providing a sample of the patient, and
determining at least one change in the nucleotide sequence chosen from rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, rs10425763, rs20551, rs72846670, rs73979902, rs16906255, and rs73144285, preferably rs1885534, rs2794763, rs1799977, rs1062492, rs20551, rs16906255, particularly rs1799977 and/or rs20551, as disclosed in the Single Nucleotide Polymorphism Database dbSNP of the National Center for Biotechnology Information (NCBI), and/or a gene mutational burden in at least one gene selected from the group consisting of MLH1, DDX11, PRPF19, BTK, GTF2H4, KAT6A, TDG, MAP3K1, and SLC9A4, particularly in MLH1, and/or a tumor mutational burden (TMB).

According to certain embodiments, the at least one change in the nucleotide sequence determined is preferably chosen from NC_000013.11:g.32337751A>G, NC_000012.12:g.31101061C>T, NC_000001.11:g.16125272G>A, NC_000013.11:g.28308924G>A, NC_000002.12:g.17764976A>G, NC_000002.12:g.17768673_17768675delTAA, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000001.11:g.45338378C>T, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, NC_000022.11:g.41152004A>G, NC_000017.11:g.21416533C>T, NC_000017.11:g.21416556G>A, NC_000010.11:g.129467401T>G, and NC_000007.14:g.77040016_77040017delinsCA, further preferably chosen from NC_000001.11:g.236555959G>A, NC_000001.11:g.236586349T>C, NC_000003.12:g.37012077A>G, NC_000007.14:g.2251050C>T, NC_000022.11:g.41152004A>G, NC_000010.11:g.129467401T>G, particularly NC_000003.12:g.37012077A>G or NC_000022.11:g.41152004A>G, as complied to the Human Genome Variation Society (HGVS; www.hgvs.org/) variant nomenclature.

According to certain embodiments, the present invention relates to a method of predicting a radiotherapy success in a method of treating a lung cancer of a patient, comprising:
obtaining or providing a sample of the patient, and
determining at least one change in the nucleotide sequence chosen from NC_000013.11:g.32337751A>G, NC_000012.12:g.31101061C>T, NC_000001.11:g.16125272G>A, NC_000013.11:g.28308924G>A, NC_000002.12:g.17764976A>G, NC_000002.12:g.17768673_17768675delTAA, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000001.11:g.45338378C>T, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, NC_000022.11:g.41152004A>G, NC_000017.11:g.21416533C>T, NC_000017.11:g.21416556G>A, NC_000010.11:g.129467401T>G, and NC_000007.14:g.77040016_77040017delinsCA, further preferably chosen from NC_000001.11:g.236555959G>A, NC_000001.11:g.236586349T>C, NC_000003.12:g.37012077A>G, NC_000007.14:g.2251050C>T, NC_000022.11:g.41152004A>G, NC_000010.11:g.129467401T>G, particularly NC_000003.12:g.37012077A>G or NC_000022.11:g.41152004A>G, as complied to the Human Genome Variation Society (HGVS; www.hgvs.org/) variant nomenclature, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB).

According to certain embodiments, the present invention relates to a method of predicting a radiotherapy success in a method of treating a lung cancer of a patient, comprising:
obtaining or providing a sample of the patient, and
determining at least one change in the nucleotide sequence chosen from NC_000013.11:g.32337751A>G, NC_000012.12:g.31101061C>T, NC_000001.11:g.16125272G>A, NC_000013.11:g.28308924G>A, NC_000002.12:g.17764976A>G, NC_000002.12:g.17768673_17768675delTAA, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000007.14:g.45338378C>T, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, NC_000022.11:g.41152004A>G, NC_000017.11:g.21416533C>T, NC_000017.11:g.21416556G>A, NC_000010.11:g.129467401T>G, and NC_000007.14:g.77040016_77040017delinsCA, further preferably chosen from NC_000001.11:g.236555959G>A, NC_000001.11:g.236586349T>C, NC_000003.12:g.37012077A>G, NC_000007.14:g.2251050C>T, NC_000022.11:g.41152004A>G, NC_000010.11:g.129467401T>G, particularly NC_000003.12:g.37012077A>G or NC_000022.11:g.41152004A>G, as complied to the Human Genome Variation Society (HGVS; www.hgvs.org/) variant nomenclature, and/or a gene mutational burden in at least one gene selected from the group consisting of MLH1, DDX11, PRPF19, BTK, GTF2H4, KAT6A, TDG, MAP3K1, and SLC9A4, particularly in MLH1, and/or a tumor mutational burden (TMB).

According to certain embodiments, a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, EPHA2, FLT1, GRINA, HEATR1, NUDT1, PARP10, PRPF19, KCNJ12, SETD2, and ZNF208, preferably HEATR1, MLH1, EP300, and NUDT1, particularly preferably MLH1 and/or EP300, is indicative of an enhanced radiotherapy success in a method of treating a lung cancer of a patient.

According to certain embodiments, a change in the nucleotide sequence and/or epigenomics profile and/or expression profile and/or copy number compared to a reference sequence and/or epigenomics profile and/or expression profile and/or copy number of at least one gene selected from DDX11, GEN1, MUTYH, MGMT, and PMS2P9, preferably MGMT, is indicative of a reduced radiotherapy success in a method of treating a lung cancer of a patient.

According to certain embodiments, a change in the nucleotide sequence chosen from rs1801406, rs3754334, rs7993418, rs67714660, rs56261297, rs2275685, rs2275687, rs1885533, rs1885534, rs1006456, rs2794763, rs1799977, rs1062492, rs11136344, rs11136345, rs2240045, rs4082155, rs10425763, rs20551, rs72846670, and/or rs73979902, preferably rs1885534, rs2794763, rs1799977, rs1062492, and/or rs20551, further preferably rs1799977 and/or rs20551, is indicative of an enhanced radiotherapy success in a method of treating a lung cancer of a patient, and/or a change in the nucleotide sequence chosen from rs1046456, rs16981869, rs72407975, rs3219472, rs16906255, and/or rs73144285, preferably rs16906255, is indicative of a reduced radiotherapy success in a method of treating a lung cancer of a patient.

According to certain embodiments, a change in the nucleotide sequence chosen from NC_000013.11:g.32337751A>G, NC_000001.11:g.16125272G>A, NC_000013.11:g.28308924G>A, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, NC_000022.11:g.41152004A>G, NC_000017.11:g.21416533C>T, and/or NC_000017.11:g.21416556G>A, preferably NC_000001.11:g.236555959G>A, NC_000001.11:g.236586349T>C, NC_000003.12:g.37012077A>G, NC_000007.14:g.2251050C>T, and/or NC_000022.11:g.41152004A>G, further preferably NC_000003.12:g.37012077A>G and/or NC_000022.11:g.41152004A>G, as complied to the Human Genome Variation Society (HGVS; www.hgvs.org/) variant nomenclature, is indicative of an enhanced radiotherapy success in a method of treating a lung cancer of a patient, and/or a change in the nucleotide sequence chosen from NC_000012.12:g.31101061C>T, NC_000002.12:g.17764976A>G, NC_000002.12:g.17768673_17768675delTAA, NC_000001.11:g.45338378C>T, NC_000010.11:g.129467401T>G, and/or NC_000007.14:g.77040016_77040017delinsCA, preferably NC_000010.11:g.129467401T>G, as complied to the Human Genome Variation Society (HGVS; www.hgvs.org/) variant nomenclature, is indicative of a reduced radiotherapy success in a method of treating a lung cancer of a patient.

According to certain embodiments the cancer is a lung squamous cell carcinoma, wherein the change in the nucleotide sequence and/or epigenomics profile and/or expression profile and/or copy number compared to a reference sequence and/or epigenomics profile and/or expression profile and/or copy number, particularly a change in the nucleotide sequence compared to a reference sequence, is determined in at least one gene selected from the group consisting of BRCA2, DDX11, EPHA2, FLT1, GEN1, GRINA, HEATR1, MLH1, MUTYH, NUDT1, PARP10, PRPF19, SETD2, and ZNF208, particularly MLH1, and/or wherein the gene mutational burden is determined in at least one gene selected from the group consisting of APOLD1, DDX11, GEN1, GPER1, MLH1, POLB, and PRPF19, preferably DDX11, MLH1, and PRPF19, particularly MLH1, and/or wherein the tumor mutational burden is determined.

According to certain embodiments the cancer is a lung squamous cell carcinoma, wherein at least one change in the nucleotide sequence is determined chosen from rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, and rs10425763, preferably rs1885534, rs2794763, rs1799977, and rs1062492, particularly rs1799977, as disclosed in the Single Nucleotide Polymorphism Database dbSNP of the National Center for Biotechnology Information (NCBI), and/or wherein the gene mutational burden is determined in at least one gene selected from the group consisting of APOLD1, DDX11, GEN1, GPER1, MLH1, POLB, and PRPF19, preferably DDX11, MLH1, and PRPF19, particularly MLH1, and/or wherein the tumor mutational burden is determined.

According to certain embodiments the cancer is a lung squamous cell carcinoma, wherein at least one change in the nucleotide sequence is determined chosen from NC_000013.11:g.32337751A>G, NC_000012.12:g.31101061C>T, NC_000001.11:g.16125272G>A, NC_000013.11:g.28308924G>A, NC_000002.12:g.17764976A>G, NC_000002.12:g.17768673_17768675delTAA, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000001.11:g.45338378C>T, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, preferably NC_000001.11:g.236555959G>A, NC_000001.11:g.236586349T>C, NC_000003.12:g.37012077A>G, NC_000007.14:g.2251050C>T, particularly NC_000003.12:g.37012077A>G, as complied to the Human Genome Variation Society (HGVS; www.hgvs.org/) variant nomenclature, and/or wherein the gene mutational burden is determined in at least one gene selected from the group consisting of APOLD1, DDX11, GEN1, GPER1, MLH1, POLB, and PRPF19, preferably DDX11, MLH1, and PRPF19, particularly MLH1, and/or wherein the tumor mutational burden is determined.

According to certain embodiments, a change in the nucleotide sequence and/or epigenomics profile and/or expression profile and/or copy number compared to a reference sequence and/or epigenomics profile and/or expression profile and/or copy number of at least one gene selected from MLH1, BRCA2, EPHA2,FLT1, GRINA, HEATR1, NUDT1, PARP10, PRPF19, SETD2, and ZNF208, preferably HEATR1, MLH1, and NUDT1, particularly preferably MLH1, is indicative of an enhanced radiotherapy success in a method of treating a lung squamous cell carcinoma of a patient.

According to certain embodiments, a change in the nucleotide sequence and/or epigenomics profile and/or expression profile and/or copy number compared to a reference sequence and/or epigenomics profile and/or expression profile and/or copy number of at least one gene selected from DDX11, GEN1, and MUTYH, is indicative of a reduced radiotherapy success in a method of treating a lung squamous cell carcinoma of a patient.

According to certain embodiments a change in the nucleotide sequence chosen from rs1801406, rs3754334, rs7993418, rs67714660, rs56261297, rs2275685, rs2275687, rs1885533, rs1885534, rs1006456, rs2794763, rs1799977, rs1062492, rs11136344, rs11136345, rs2240045, rs4082155, and/or rs10425763, preferably rs1885534, rs2794763, rs1799977, and/or rs1062492, further preferably rs1799977, is indicative of an enhanced radiotherapy success in a method of treating a lung squamous cell carcinoma of a patient, and/or a change in the nucleotide sequence chosen from rs1046456, rs16981869, rs72407975, and/or rs3219472 is indicative of a reduced radiotherapy success in a method of treating a lung squamous cell carcinoma of a patient.

According to certain embodiments a change in the nucleotide sequence chosen from NC_000013.11:g.32337751A>G, NC_000001.11:g.16125272G>A, NC_000013.11:g.28308924G>A, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000007.14:g.2251050C>T, NC_000008.11:g.143985257T>C, NC_000008.11:g.143985944G>A, NC_000011.10:g.60903374C>T, NC_000003.12:g.47083895G>A, and/or NC_000019.10:g.21973116T>C, preferably NC_000001.11:g.236555959G>A, NC_000001.11:g.236586349T>C, NC_000003.12:g.37012077A>G, and/or NC_000007.14:g.2251050C>T, particularly NC_000003.12:g.37012077A>G, as complied to the Human Genome Variation Society (HGVS; www.hgvs.org/) variant nomenclature, is indicative of an enhanced radiotherapy success in a method of treating a lung squamous cell carcinoma of a patient, and/or a change in the nucleotide sequence chosen from NC_000012.12:g.31101061C>T, NC_000002.12:g.17764976A>G, NC_000002.12:g.17768673_17768675delTAA, and/or NC_000001.11:g.45338378C>T, as complied to the Human Genome Variation Society (HGVS; www.hgvs.org/) variant nomenclature, is indicative of a reduced radiotherapy success in a method of treating a lung squamous cell carcinoma of a patient.

According to certain embodiments a combination of at least two changes in the nucleotide sequence and/or epigenomics profile and/or expression profile and/or copy number compared to a reference sequence and/or epigenomics profile and/or expression profile and/or copy number within one gene or in at least two genes, particularly at least two changes in the nucleotide sequences above, and/or a combination of gene mutational burdens in at least two genes, and/or a combination of at least one change in the nucleotide sequence and/or epigenomics profile and/or expression profile and/or copy number compared to a reference sequence and/or epigenomics profile and/or expression profile and/or copy number of at least one gene, particularly at least one change in the nucleotide sequence above, and a gene mutational burden in at least one gene that is the same or different thereof, and/or at least one change in the nucleotide sequence and/or epigenomics profile and/or expression profile and/or copy number compared to a reference sequence and/or epigenomics profile and/or expression profile and/or copy number of at least one gene, particularly at least one change in the nucleotide sequence above, and the tumor mutational burden, and/or a gene mutational burden in at least one gene and the tumor mutational burden, particularly at least one change in the nucleotide sequence and/or epigenomics profile and/or expression profile and/or copy number compared to a reference sequence and/or epigenomics profile and/or expression profile and/or copy number of at least one gene, particularly at least one change in the nucleotide sequence above, and the tumor mutational burden, are determined.

FIG. 1 shows schematically steps in a method of the first aspect of embodiments of the present invention, wherein step 1 corresponds to obtaining or providing a sample of the patient, and step 2 corresponds to determining a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, and/or a tumor mutational burden (TMB).

A second aspect of embodiments of the present invention is directed to a use of a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, preferably MLH1, EP300, HEATR1, NUDT1, and MGMT, further preferably MLH1 and EP300, particularly a change in the nucleotide sequence chosen from rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, rs10425763, rs20551, rs72846670, rs73979902, rs16906255, and/or rs73144285, as disclosed in the Single Nucleotide Polymorphism Database dbSNP of the National Center for Biotechnology Information (NCBI), and/or NC_000007.14:g.77040016_77040017delinsCA, as complied to the Human Genome Variation Society (HGVS; www.hgvs.org/) variant nomenclature, preferably rs1885534, rs2794763, rs1799977, rs1062492, rs20551, rs16906255, particularly rs1799977 and/or rs20551, as disclosed in the Single Nucleotide Polymorphism Database dbSNP of the National Center for Biotechnology Information (NCBI), further particularly at least one change in the nucleotide sequence chosen from NC_000013.11:g.32337751A>G, NC_000012.12:g.31101061C>T, NC_000001.11:g.16125272G>A, NC_000013.11:g.28308924G>A, NC_000002.12:g.17764976A>G, NC_000002.12: g. 17768673_17768675delTAA, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000001.11:g.45338378C>T, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, NC_000022.11:g.41152004A>G, NC_000017.11:g.21416533C>T, NC_000017.11:g.21416556G>A, NC_000010.11:g.129467401T>G, and NC_000007.14:g.77040016_77040017delinsCA, further preferably chosen from NC_000001.11:g.236555959G>A, NC_000001.11:g.236586349T>C, NC_000003.12:g.37012077A>G, NC_000007.14:g.2251050C>T, NC_000022.11:g.41152004A>G, NC_000010.11:g.129467401T>G, particularly NC_000003.12:g.37012077A>G or NC_000022.11:g.41152004A>G, as complied to the Human Genome Variation Society (HGVS; www.hgvs.org/) variant nomenclature, and/or a gene mutational burden in at least one gene selected from the group consisting of MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, preferably MLH1, DDX11, PRPF19, BTK, GTF2H4, KAT6A, TDG, MAP3K1, and SLC9A4, further preferably MLH1, and/or a tumor mutational burden (TMB), as a marker for predicting a radiotherapy success in a method of treating a lung cancer of a patient.

According to certain embodiments the second aspect is directed to the use of a change in the nucleotide sequence and/or epigenomics profile and/or expression profile and/or copy number compared to a reference sequence and/or epigenomics profile and/or expression profile and/or copy number of at least one gene selected from MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208, preferably MLH1, EP300, HEATR1, NUDT1, and MGMT, further preferably MLH1 and EP300, particularly a change in the nucleotide sequence chosen from rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, rs10425763, rs20551, rs72846670, rs73979902, rs16906255, and/or rs73144285, as disclosed in the Single Nucleotide Polymorphism Database dbSNP of the National Center for Biotechnology Information (NCBI), and/or NC_000007.14:g.77040016_77040017delinsCA as complied to the Human Genome Variation Society (HGVS; www.hgvs.org/) variant nomenclature, preferably rs1885534, rs2794763, rs1799977, rs1062492, rs20551, rs16906255, particularly rs1799977 and/or rs20551, as disclosed in the Single Nucleotide Polymorphism Database dbSNP of the National Center for Biotechnology Information (NCBI), further particularly at least one change in the nucleotide sequence chosen from NC_000013.11:g.32337751A>G, NC_000012.12:g.31101061C>T, NC_000001.11:g.16125272G>A, NC_000013.11:g.28308924G>A, NC_000002.12:g.17764976A>G, NC_000002.12: g. 17768673_17768675delTAA, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000001.11:g.45338378C>T, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, NC_000022.11:g.41152004A>G, NC_000017.11:g.21416533C>T, NC_000017.11:g.21416556G>A, NC_000010.11:g.129467401T>G, and NC_000007.14:g.77040016_77040017delinsCA, further preferably chosen from NC_000001.11:g.236555959G>A, NC_000001.11:g.236586349T>C, NC_000003.12:g.37012077A>G, NC_000007.14:g.2251050C>T, NC_000022.11: g.41152004A>G, NC_000010.11:g.129467401T>G, particularly NC_000003.12:g.37012077A>G or NC_000022.11:g.41152004A>G, as complied to the Human Genome Variation Society (HGVS; www.hgvs.org/) variant nomenclature, as a marker for predicting a radiotherapy success in a method of treating a lung cancer of a patient.

For the use of the second aspect also the differentiations regarding the specific genes and sequences with regard to treating LUSC and/or with regard to enhanced/reduced radiotherapy success, etc., given with regard to the first aspect apply.

A third aspect of embodiments of the present invention relates to a database comprising the markers disclosed in the second aspect. The database particularly comprises at least one change each in the nucleotide sequence and/or epigenomics profile and/or expression profile and/or copy number compared to a reference sequence and/or epigenomics profile and/or expression profile and/or copy number of the genes MLH1 and EP300, preferably MLH1, EP300, HEATR1, NUDT1, and MGMT, further preferably of the genes MLH1, EP300, BRCA2, FLT1, GRINA, HEATR1, MUTYH, NUDT1, PARP10, PRPF19, KCNJ12, MGMT, PMS2P9, DDX11, EPHA2, GEN1, SETD2, and ZNF208. According to certain embodiments, the database of the third aspect particularly comprises the changes in the nucleotide sequence rs1799977 and rs20551, as disclosed in the Single Nucleotide Polymorphism Database dbSNP of the National Center for Biotechnology Information (NCBI), preferably rs1885534, rs2794763, rs1799977, rs1062492, rs20551, and rs16906255, further preferably rs1801406, rs1046456, rs3754334, rs7993418, rs16981869, rs72407975, rs67714660, rs56261297, rs2275685, rs2275687, rs1885533, rs1885534, rs1006456, rs2794763, rs1799977, rs3219472, rs1062492, rs11136344, rs11136345, rs2240045, rs4082155, rs10425763, rs20551, rs72846670, rs73979902, rs16906255, and rs73144285, as disclosed in the Single Nucleotide Polymorphism Database dbSNP of the National Center for Biotechnology Information (NCBI), and NC_000007.14:g.77040016_77040017delinsCA, as complied to the Human Genome Variation Society (HGVS; www.hgvs.org/) variant nomenclature, as markers. According to certain embodiments, the database of the third aspect further particularly comprises the changes in the nucleotide sequence NC_000003.12:g.37012077A>G and NC_000022.11:g.41152004A>G, preferably NC_000001.11:g.236555959G>A, NC_000001.11:g.236586349T>C, NC_000003.12:g.37012077A>G, NC_000007.14:g.2251050C>T, NC_000022.11:g.41152004A>G, NC_000010.11:g.129467401T>G, further preferably NC_000013.11:g.32337751A>G, NC_000012.12:g.31101061C>T, NC_000001.11:g.16125272G>A, NC_000013.11:g.28308924G>A, NC_000002.12:g.17764976A>G, NC_000002.12:g.17768673_17768675delTAA, NC_000008.11:g.143991836C>G, NC_000008.11:g.143992685C>T, NC_000001.11:g.236553659C>T, NC_000001.11:g.236554626T>C, NC_000001.11:g.236555893A>G, NC_000001.11:g.236555959G>A, NC_000001.11:g.236585205T>C, NC_000001.11:g.236586349T>C, NC_000003.12:g.37012077A>G, NC_000001.11:g.45338378C>T, NC_000007.14:g.2251050C>T, NC_000008.11:g.143985257T>C, NC_000008.11:g.143985944G>A, NC_000011.10:g.60903374C>T, NC_000003.12:g.47083895G>A, NC_000019.10:g.21973116T>C, NC_000022.11:g.41152004A>G, NC_000017.11:g.21416533C>T, NC_000017.11:g.21416556G>A, NC_000010.11:g.129467401T>G, and NC_000007.14:g.77040016_77040017delinsCA, as complied to the Human Genome Variation Society (HGVS; www.hgvs.org/) variant nomenclature, as markers. In addition, the database of the third aspect comprises according to certain embodiments a gene mutational burden in the gene MLH1, preferably in the genes MLH1, DDX11, PRPF19, BTK, GTF2H4, KAT6A, TDG, and MAP3K1, further preferably in the genes MLH1, DDX11, APOLD1, GEN1, GPER1, POLB, PRPF19, ANKRD30A, AR, BTK, GTF2H4, HEATR1, IKBKE, KAT6A, NUDT19, PARP1, PTPRT, TAF3, TDG, MAP3K1, and SLC9A4, as markers. In addition, the database of the third aspect comprises according to certain embodiments at least one tumor mutational burden (TMB) as a marker.

Apart from containing the markers, the database is not particularly restricted, and can be e.g. machine readable, etc.

A fourth aspect of embodiments of the present invention relates to a method of predicting a radiotherapy success in a method of treating a lung cancer of a patient, comprising:
obtaining nucleotide sequence data and/or epigenomics profile data and/or expression profile data and/or copy number data of a sample of a patient, and
determining the presence of at least one marker as disclosed in the second aspect.

In the method of the fourth aspect the step of obtaining nucleotide sequence data and/or epigenomics profile data and/or expression profile data and/or copy number data of a sample of a patient is not particularly restricted, and the respective data can be obtained by any suitable method, particularly in electronic form, e.g. based on an evaluation of a sample of a patient.

Also, the step of determining the presence of at least one marker as disclosed in the second aspect is not particularly restricted, and it can be carried out in any suitable manner, e.g. using sufficient tools for automatically evaluating the nucleotide sequence data and/or epigenomics profile data and/or expression profile data and/or copy number data of the sample of the patient for the presence of the respective marker(s). For example, the evaluation can be carried out with the help of or exclusively using a computer program product, which is not particularly restricted.

Figure 2:
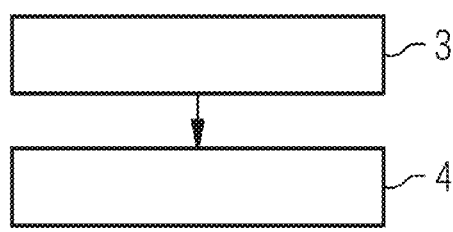
In FIG. 2 a method of the fourth aspect of embodiments of the present invention is illustrated schematically.

In FIG. 2 a method of the fourth aspect of embodiments of the present invention is illustrated schematically, wherein step 3 corresponds to obtaining nucleotide sequence data and/or epigenomics profile data and/or expression profile data and/or copy number data of a sample of a patient, and step 4 to determining the presence of at least one marker as disclosed in the second aspect.

In a fifth aspect a computer program product is disclosed, comprising computer executable instructions which, when executed, perform a method according to the fourth aspect.

The computer program product is thereby not particularly restricted as long as it comprises computer executable instructions which, when executed, perform the method according to the fourth aspect. According to certain embodiments the computer program product is one on which program commands or program codes of a computer program for executing said method are stored. According to certain embodiments the computer program product is or comprises a storage medium.

A sixth aspect of embodiments of the present invention relates to a method of predicting a radiotherapy success in a method of treating a lung cancer of a patient, comprising:
obtaining nucleotide sequence data and/or epigenomics profile data and/or expression profile data and/or copy number data of a sample of a patient, and analyzing the nucleotide sequence data using the computer program product of the fifth aspect.

Again, the step of obtaining nucleotide sequence data and/or epigenomics profile data and/or expression profile data and/or copy number data of a sample of a patient is not particularly restricted, as in the fourth aspect.

Also, the step of analyzing the nucleotide sequence data using the computer program product of the fifth aspect is not particularly restricted and can be carried out e.g. automatically, but also with the settings of suitable parameters by a user.

Figure 3:
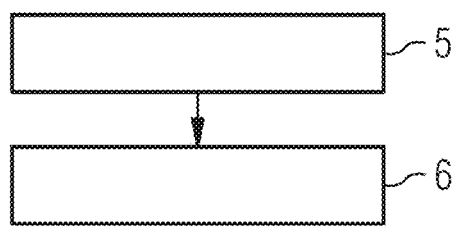
FIG. 3 depicts schematically a method of the sixth aspect of embodiments of the present invention.

FIG. 3 depicts schematically a method of the sixth aspect of embodiments of the present invention, wherein step 5 corresponds to obtaining nucleotide sequence data and/or epigenomics profile data and/or expression profile data and/or copy number data of a sample of a patient, and step 6 corresponds to analyzing the nucleotide sequence data using the computer program product of the fifth aspect.

The inventors have also particularly found that a change in the nucleotide sequence and/or epigenomics profile and/or expression profile and/or copy number compared to a reference sequence and/or epigenomics profile and/or expression profile and/or copy number in a DNA damage repair gene can be predictive of a radiotherapy success in a method of treating a cancer of a patient, particularly a lung cancer.

Particularly this was found for the following DNA damage repair genes:

UNG, SMUG1, MBD4, TDG, OGG1, MUTYH, NTHL1, MPG, NEIL1, NEIL2, NEIL3, APEX1, APEX2, LIG3, XRCC1, PNKP, APLF, PARP1, PARP2, PARP3, MGMT, ALKBH2, ALKBH3, TDP1, TDP2, MSH2, MSH3, MSH6, MLH1, PMS2, MSH4, MSH5, MLH3, PMS1, PMS2P3, XPC, RAD23B, CETN2, RAD23A, XPA, DDB1, DDB2, RPA1, RPA2, RPA3, ERCC3, ERCC2, GTF2H1, GTF2H2, GTF2H3, GTF2H4, GTF2H5, CDK7, CCNH, MNAT1, ERCC5, ERCC1, ERCC4, LIG1, ERCC8, ERCC6, UVSSA, XAB2, MMS19, RAD51, RAD51B, RAD51D, DMC1, XRCC2, XRCC3, RAD52, RAD54L, RAD54B, BRCA1, SHFM1, RAD50, MRE11A, NBN, RBBP8, MUS81, EME1, EME2, SLX1A, SLX1B, GEN1, FANCA, FANCB, FANCC, BRCA2, FANCD2, FANCE, FANCF, FANCG, FANCI, BRIP1, FANCL, FANCM, PALB2, RAD51C, SLX4, FAAP20, FAAP24, XRCC6, XRCC5, PRKDC, LIG4, XRCC4, DCLRE1C, NHEJ1, NUDT1, DUT, RRM2B, POLB, POLG, POLD1, POLE, PCNA, REV3L, MAD2L2, REV1, POLH, POLI, POLQ, POLK, POLL, POLM, POLN, FEN1, FAN1, TREX1, TREX2, EX01, APTX, SPO11, ENDOV, UBE2A, UBE2B, RAD18, SHPRH, HLTF, RNF168, SPRTN, RNF8, UBE2V2, UBE2N, H2AFX, CHAF1A, SETMAR, BLM, WRN, RECQL4, ATM, MPLKIP, DCLRE1A, DCLRE1B, RPA4, PRPF19, RECQL, RECQL5, HELQ, RDM1, NABP2, ATR, ATRIP, MDC1, RAD1, RAD9A, HUS1, RAD17, CHEK1, CHEK2, TP53, TP53BP1, RIF1, TOPBP1, CLK2, PER1, and RNF4.

The DNA damage repair genes therein can be e.g. grouped as follows:

Base excision repair (BER) DNA glycosylases
UNG, SMUG1, MBD4, TDG, OGG1, MUTYH, NTHL1, MPG, NEIL1, NEIL2, NEIL3
Other BER and strand break joining factors
APEX1, APEX2, LIG3, XRCC1, PNKP, APLF
Poly(ADP-ribose) polymerase (PARP) enzymes that bind to DNA PARP1, PARP2, PARP3, MGMT, ALKBH2, ALKBH3
Repair of DNA-topoisomerase crosslinks
TDP1, TDP2
Mismatch excision repair (MMR)
MSH2, MSH3, MSH6, MLH1, PMS2, MSH4, MSH5, MLH3, PMS1, PMS2P3
Nucleotide excision repair (NER)
XPC, RAD23B, CETN2, RAD23A, XPA, DDB1, DDB2, RPA1, RPA2, RPA3
TFIIH (Transcription factor II H)
ERCC3, ERCC2, GTF2H1, GTF2H2, GTF2H3, GTF2H4, GTF2H5, CDK7, CCNH, MNAT1, ERCC5, ERCC1, ERCC4, LIG1
NER-related
ERCC8, ERCC6, UVSSA, XAB2, MMS19
Homologous recombination
RAD51, RAD51B, RAD51D, DMC1, XRCC2, XRCC3, RAD52, RAD54L, RAD54B, BRCA1, SHFM1, RAD50, MRE11A, NBN, RBBP8, MUS81, EME1, EME2, SLX1A, SLX1B, GEN1
Fanconi anemia
FANCA, FANCB, FANCC, BRCA2, FANCD2, FANCE, FANCF, FANCG, FANCI, BRIP1, FANCL, FANCM, PALB2, RAD51C, SLX4, FAAP20, FAAP24
Non-homologous end-joining
XRCC6, XRCC5, PRKDC, LIG4, XRCC4, DCLRE1C, NHEJ1
Modulation of nucleotide pools
NUDT1, DUT, RRM2B
DNA polymerases (catalytic subunits)
POLB, POLG, POLD1, POLE, PCNA, REV3L, MAD2L2, REV1, POLH, POLI, POLQ, POLK, POLL, POLM, POLN
Editing and processing nucleases
FEN1, FAN1, TREX1, TREX2, EX01, APTX, SPO11, ENDOV
Ubiquitination and modification
UBE2A, UBE2B, RAD18, SHPRH, HLTF, RNF168, SPRTN, RNF8, RNF4, UBE2V2, UBE2N
Chromatin structure and modification
H2AFX, CHAF1A, SETMAR
Genes defective in diseases associated with sensitivity to DNA damaging agents
BLM, WRN, RECQL4, ATM, MPLKIP
Other identified genes with known or suspected DNA repair function
DCLRE1A, DCLRE1B, RPA4, PRPF19, RECQL, RECQL5, HELQ, RDM1, NABP2
Other conserved DNA damage response genes
ATR, ATRIP, MDC1, RAD1, RAD9A, HUS1, RAD17, CHEK1, CHEK2, TP53, TP53BP1, RIF1, TOPBP1, CLK2, PER1

The above embodiments can be combined arbitrarily, if appropriate. Further possible embodiments and implementations of embodiments of the present invention comprise also combinations of features not explicitly mentioned in the foregoing or in the following with regard to the Examples of the present invention. Particularly, a person skilled in the art will also add individual aspects as improvements or additions to the respective basic form of the present invention.

EXAMPLES

Embodiments of the present invention will now be described in detail with reference to several examples thereof. However, these examples are illustrative and do not limit the scope of the present invention.

Example 1

I) Cohort Information

A cohort of 84 patients with non-small cell lung cancer (NSCLC) and different response rates to chemoradiotherapy was evaluated in a cross-validated evaluation. The therapy comprised neoadjuvant radiochemotherapy (RCT).

The samples of the cohort were fresh frozen tumor tissue. NSCLC samples were classified as either lung adenocarcinoma (LUAD), lung squamous cell carcinoma (LUSC), NSCLC neuroendocrine differentiation (NE), or NSCLC not otherwise specified (NOS). Patient samples were classified as either complete response (CR), partial response (PR), stable disease (SD), or progressive disease (PD), dependent on locoregional response to chemoradiation. LUSC samples were classified as either complete response (CR), partial response (PR), stable disease (SD), or progressive disease (PD), dependent on locoregional response to chemoradiation.

The exome of extracted sample DNA was enriched using the Agilent® SureSelect® Human All Exon V6+COSMIC hybridization capture kit and sequenced on an Illumina® NextSeq® 500 instrument.

Further information regarding the patients is given in Tables 1 (cancer stage), 2 (cancer subtype) and 3 (pathological response).

TABLE 1 cancer stage of patients

| Stage | #Patients |
|---|---|
| IIA | 3 |
| IIB | 7 |
| IIIA | 69 |
| IIIB | 5 |

TABLE 2

Cancer subtype

| Subtype | #Patients |
|---|---|
| LUAD | 44 |
| LUSC | 32 |
| NSCLC NE | 2 |
| NSCLC NOS | 6 |

TABLE 3

Pathologic response

| Response | | #NSCLC | #LUAD | #LUSC |
|---|---|---|---|---|
| Yes | CR | 21 | 6 | 13 |
|  | PR | 20 | 11 | 7 |
| No | SD | 19 | 15 | 3 |
|  | PD | 24 | 12 | 9 |

II) Variant Calling

Small insertions, deletions, single nucleotide variants (SNVs), multiple nucleotide variants (MNVs), and replacements (in the following termed variants) were called using the Low Frequency Variant Detection tool from the Identify and Annotate Variants (WES)—Workflow of the QIAGEN® Biomedical Genomics Workbench 5.0.1.

The parameter setting was as follows: QIAGEN® Biomedical Genomics Workbench 5.0.1 a) Identify and Annotate Variants (WES)
Map Reads to Reference

| Parameter | Value |
|---|---|
| References | GRCh38.p7 |
| Masking mode | No masking |
| Match score | 1 |
| Mismatch cost | 2 |
| Cost of insertions and deletions | Affine gap cost |
| Insertion open cost | 6 |
| Insertion extend cost | 1 |
| Deletion open cost | 6 |
| Deletion extend cost | 1 |
| Length fraction | 0.5 |
| Similarity fraction | 0.8 |
| Global alignment | No |
| Auto-detect paired distances | Yes |
| Non-specific match handling | Map randomly |
| Output mode | Create reads track |
| Create report | No |
| Collect un-mapped reads | No | b) InDels and Structural Variants 1.85

| Parameter | Value |
|---|---|
| P-value threshold | 0.0001 |
| Maximum number of mismatches | 2 |
| Create report | No |
| Create breakpoints | No |
| Create InDel variants | Yes |
| Ignore broken pairs | Yes |
| Minimum relative consensus coverage | 0.2 |
| Minimum quality score | 30 |
| Create structural variations | No |
| Filter variants | Yes |
| Minimum number of reads | 3 |
| Restrict calling to target regions | S07604715_Padded.bed* |

*Target regions of Agilent's SureSelect Human All Exon V6 + COSMIC r2 (Design ID: S07604715)

c) Local Realignment 0.41

| Parameter | Value |
|---|---|
| Realign unaligned ends | Yes |
| Multi-pass realignment | 3 |
| Guidance-variant track | InDels from InDels and Structural Variants |
| Maximum guidance-variant length | 200 |
| Force realignment to guidance-variants | No |
| Output mode | Create reads track |
| Output track of realigned regions | No | d) Low Frequency Variant Detection 2.0

| Parameter | Value |
|---|---|
| Required significance (%) | 1.0 |
| Ignore positions with coverage above | 100,000 |
| Restrict calling to target regions | S07604715_Padded.bed* |

-continued

| Parameter | Value |
| --- | --- |
| Ignore broken pairs | Yes |
| Ignore non-specific matches | Reads |
| Minimum coverage | 5 |
| Minimum count | 3 |
| Minimum frequency (%) | 5.0 |
| Base quality filter | Yes |
| Neighborhood radius | 5 |
| Minimum central quality | 30 |
| Minimum neighborhood quality | 20 |
| Read direction filter | No |
| Relative read direction filter | No |
| Read position filter | Yes |
| Significance (%) | 1.0 |
| Remove pyro-error variants | No |
| Create track | Yes |
| Create annotated table | No |
| Create report | No |

*Target regions of Agilent's SureSelect Human All Exon V6 + COS MIC r2 (Design ID: S07604715)

e) Remove False Positives 1.2

| Parameter | Value |
| --- | --- |
| Minimum frequency (%) | 5.0 |
| Minimum forward/reverse balance | 0.1 |
| Minimum average base quality | 30.0 |
| Variant frequency | Yes |
| Forward/reverse balance | Yes |
| Average base quality | Yes |

III) Statistical Analysis and Machine Learning

In the following, the methods used to build models predicting radiotherapy response are described.

Three feature levels were included:

1. Small insertions, small deletions, single nucleotide variants (SNVs), multiple nucleotide variants (MNVs), and replacements (in the following termed variants)
2. Mutational burden in single genes (GMB)
3. Mutational burden in multiple genes (TMB)

Only informative GMB features (standard deviation across samples >0.5) and frequently occurring variants (variants occurring in at least 50% of samples in either response group) were considered.

Features with a p-value <0.05 calculated using either Fisher's exact tests (variants) or Wilcoxon rank-sum tests (GMB features) were selected. In the process, a bootstrapping procedure was applied to primarily select stable/recurrent features, i.e. features that repeatedly emerge in bootstrapping samples (features with p-value <0.05 in at least 80% of 50 bootstrap samples containing a random sample of 80% of all samples).

For the predictive models, both linear—in particular elastic-net regularized logistic regression (R package glmnet 2.0-16; alpha=0.99)—and non-linear—in particular random forest (R package randomForest 4.6-14; ntree=1000)—models were calculated predicting radiotherapy response. To evaluate the performance of predictive models, a 100-fold iterated 4-fold cross-validation procedure was applied.

IV) Results i) Variants

The variants described in the following were found.

The variants are uniquely characterized by their Human Genome Variation Society (HGVS) nomenclature, Single Nucleotide Polymorphism Database (dbSNP) identifier, ClinVar identifier and/or Universal Protein Knowledgebase (UniProtKB) identifier (as of Apr. 25, 2019)

LUSC-Specific Variants

The following variants are specifically predictive for radiotherapy response in lung squamous cell carcinoma (LUSC) patients. The number and fraction of patients carrying the respective variant are split into those that do respond (CR and PR) and those that do not respond (SD and PD) to locoregional chemoradiation.

1) BRCA2

| Database | ID/URI |
| --- | --- |
| HGVS | NC_000013.11:g.32337751A>G |
| dbSNP | https://www.ncbi.nlm.nih.gov/snp/rs1801406 |
| ClinVar | https://preview.ncbi.nlm.nih.gov/clinvar/variation/126010 |
| UniProtKB | — |

| Response | #Patients |
| --- | --- |
| Yes | 11 (of 20) |
| No | 1 (of 12) |

Potential effect of variant on tumor sensitivity to ionizing radiation: Enhanced

2) DDX11

| Database | ID/URI |
| --- | --- |
| HGVS | NC_000012.12:g.31101061C>T |
| dbSNP | https://www.ncbi.nlm.nih.gov/snp/rs1046456 |
| ClinVar | — |
| UniProtKB | — |

| Response | #Patients |
| --- | --- |
| Yes | 8 (of 20) |
| No | 11 (of 12) |

Potential effect of variant on tumor sensitivity to ionizing radiation: Reduced

3) EPHA2

| Database | ID/URI |
| --- | --- |
| HGVS | NC_000001.11:g.16125272G>A |
| dbSNP | https://www.ncbi.nlm.nih.gov/snp/rs3754334 |
| ClinVar | https://preview.ncbi.nlm.nih.gov/clinvar/variation/259392 |
| UniProtKB | — |

| Response | #Patients |
| --- | --- |
| Yes | 11 (of 20) |
| No | 1 (of 12) |

Potential effect of variant on tumor sensitivity to ionizing radiation: Enhanced

4) FLT1

| Database | ID/URI |
| --- | --- |
| HGVS | NC_000013.11:g.28308924G>A |
| dbSNP | https://www.ncbi.nlm.nih.gov/snp/rs7993418 |
| ClinVar | — |
| UniProtKB | — |

-continued

| Response | #Patients |
|---|---|
| Yes | 20 (of 20) |
| No | 8 (of 12) |

Potential effect of variant on tumor sensitivity to ionizing radiation: Enhanced

5) GEN1

| Database | ID/URI |
|---|---|
| HGVS | NC_000002.12:g.17764976A>G |
| dbSNP | https://www.ncbi.nlm.nih.gov/snp/rs16981869 |
| ClinVar | — |
| UniProtKB | https://www.uniprot.org/uniprot/Q17RS7#VAR_037845 |

| Response | #Patients |
|---|---|
| Yes | 2 (of 20) |
| No | 6 (of 12) |

Potential effect of variant on tumor sensitivity to ionizing radiation: Reduced

6) GEN1

| Database | ID/URI |
|---|---|
| HGVS | NC_000002.12:g.17768673_17768675delTAA) |
| dbSNP | https://www.ncbi.nlm.nih.gov/projects/SNP/snp_ref.cgi?do_not_redirect&rs=rs72407975 |
| ClinVar | — |
| UniProtKB | — |

| Response | #Patients |
|---|---|
| Yes | 1 (of 20) |
| No | 6 (of 12) |

Potential effect of variant on tumor sensitivity to ionizing radiation: Reduced

7) GRINA

| Database | ID/URI |
|---|---|
| HGVS | NC_000008.11:g.143991836C>G |
| dbSNP | https://www.ncbi.nlm.nih.gov/snp/rs67714660 |
| ClinVar | — |
| UniProtKB | — |

| Response | #Patients |
|---|---|
| Yes | 19 (of 20) |
| No | 6 (of 12) |

Potential effect of variant on tumor sensitivity to ionizing radiation: Enhanced

8) GRINA

| Database | ID/URI |
|---|---|
| HGVS | NC_000008.11:g.143992685C>T |
| dbSNP | https://www.ncbi.nlm.nih.gov/snp/rs56261297 |
| ClinVar | — |
| UniProtKB | — |

| Response | #Patients |
|---|---|
| Yes | 19 (of 20) |
| No | 6 (of 12) |

Potential effect of variant on tumor sensitivity to ionizing radiation: Enhanced

9) HEATR1

| Database | ID/URI |
|---|---|
| HGVS | NC_000001.11:g.236553659C>T |
| dbSNP | https://www.ncbi.nlm.nih.gov/snp/rs2275685 |
| ClinVar | — |
| UniProtKB | — |

| Response | #Patients |
|---|---|
| Yes | 20 (of 20) |
| No | 8 (of 12) |

Potential effect of variant on tumor sensitivity to ionizing radiation: Enhanced

10) HEATR1

| Database | ID/URI |
|---|---|
| HGVS | NC_000001.11:g.236554626T>C |
| dbSNP | https://www.ncbi.nlm.nih.gov/snp/rs2275687 |
| ClinVar | — |

-continued

| | |
|---|---|
| UniProtKB | https://www.uniprot.org/uniprot/Q9H583#VAR_010942 |

| Response | #Patients |
|---|---|
| Yes | 20 (of 20) |
| No | 8 (of 12) |

Potential effect of variant on tumor sensitivity to ionizing radiation: Enhanced

11) HEATR1

| Database | ID/URI |
|---|---|
| HGVS | NC_000001.11:g.236555893A>G |
| dbSNP | https://www.ncbi.nlm.nih.gov/snp/rs1885533 |
| ClinVar | — |
| UniProtKB | https://www.uniprot.org/uniprot/Q9H583#VAR_010940 |

| Response | #Patients |
|---|---|
| Yes | 20 (of 20) |
| No | 8 (of 12) |

Potential effect of variant on tumor sensitivity to ionizing radiation: Enhanced

12) HEATR1

| Database | ID/URI |
|---|---|
| HGVS | NC_000001.11:g.236555959G>A |
| dbSNP | https://www.ncbi.nlm.nih.gov/snp/rs1885534 |

13) HEATR1

| Database | ID/URI |
|---|---|
| HGVS | NC_000001.11:g.236585205T>C |
| dbSNP | https://www.ncbi.nlm.nih.gov/snp/rs1006456 |
| ClinVar | — |
| UniProtKB | — |

| Response | #Patients |
|---|---|
| Yes | 20 (of 20) |
| No | 8 (of 12) |

Potential effect of variant on tumor sensitivity to ionizing radiation: Enhanced

14) HEATR1

| Database | ID/URI |
|---|---|
| HGVS | NC_000001.11:g.236586349T>C |
| dbSNP | https://www.ncbi.nlm.nih.gov/snp/rs2794763 |
| ClinVar | — |
| UniProtKB | https://www.uniprot.org/uniprot/Q9H583#VAR_049330 |

| Response | #Patients |
|---|---|
| Yes | 20 (of 20) |
| No | 7 (of 12) |

Potential effect of variant on tumor sensitivity to ionizing radiation: Enhanced

15) MLH1

| Database | ID/URI |
|---|---|
| HGVS | NC_000003.12:g.37012077A>G |
| dbSNP | https://www.ncbi.nlm.nih.gov/snp/rs1799977 |
| ClinVar | https://preview.ncbi.nlm.nih.gov/clinvar/variation/36557 |
| UniProtKB | https://www.uniprot.org/uniprot/P40692#VAR_004450 |

| Response | #Patients |
|---|---|
| Yes | 13 (of 20) |
| No | 0 (of 12) |

Potential effect of variant on tumor sensitivity to ionizing radiation: Enhanced

16) MUTYH

| Database | ID/URI |
|---|---|
| HGVS | NC_000001.11:g.45338378C>T |
| dbSNP | https://www.ncbi.nlm.nih.gov/snp/rs3219472 |
| ClinVar | — |
| UniProtKB | — |

| Response | #Patients |
|---|---|
| Yes | 4 (of 20) |
| No | 8 (of 12) |

Potential effect of variant on tumor sensitivity to ionizing radiation: Reduced

17) NUDT1

| Database | ID/URI |
|---|---|
| HGVS | NC_000007.14:g.2251050C>T |
| dbSNP | https://www.ncbi.nlm.nih.gov/snp/rs1062492 |
| ClinVar | — |
| UniProtKB | — |

| Response | #Patients |
|---|---|
| Yes | 10 (of 20) |
| No | 0 (of 12) |

Potential effect of variant on tumor sensitivity to ionizing radiation: Enhanced

18) PARP10

| Database | ID/URI |
|---|---|
| HGVS | NC_000008.11:g.143985257T>C |
| dbSNP | https://www.ncbi.nlm.nih.gov/snp/rs11136344 |
| ClinVar | — |
| UniProtKB | https://www.uniprot.org/uniprot/Q9H583#VAR_027859 |

| Response | #Patients |
|---|---|
| Yes | 19 (of 20) |
| No | 6 (of 12) |

Potential effect of variant on tumor sensitivity to ionizing radiation: Enhanced

19) PARP10

| Database | ID/URI |
|---|---|
| HGVS | NC_000008.11:g.143985944G>A |
| dbSNP | https://www.ncbi.nlm.nih.gov/snp/rs11136345 |
| ClinVar | — |
| UniProtKB | — |

| Response | #Patients |
|---|---|
| Yes | 19 (of 20) |
| No | 6 (of 12) |

Potential effect of variant on tumor sensitivity to ionizing radiation: Enhanced

20) PRPF19

| Database | ID/URI |
|---|---|
| HGVS | NC_000011.10:g.60903374C>T |
| dbSNP | https://www.ncbi.nlm.nih.gov/snp/rs2240045 |
| ClinVar | — |
| UniProtKB | — |

| Response | #Patients |
|---|---|
| Yes | 17 (of 20) |
| No | 4 (of 12) |

Potential effect of variant on tumor sensitivity to ionizing radiation: Enhanced

21) SETD2

| Database | ID/URI |
|---|---|
| HGVS | NC_000003.12:g.47083895G>A |
| dbSNP | https://www.ncbi.nlm.nih.gov/snp/rs4082155 |
| ClinVar | https://preview.ncbi.nlm.nih.gov/clinvar/variation/135202 |
| UniProtKB | https://www.uniprot.org/uniprot/Q9BYW2#VAR_027841 |

—continued (ClinVar —, UniProtKB —)

| Response | #Patients |
|---|---|
| Yes | 20 (of 20) |
| No | 7 (of 12) |

| Response | #Patients |
| --- | --- |
| Yes | 18 (of 20) |
| No | 5 (of 12) |

Potential effect of variant on tumor sensitivity to ionizing radiation: Enhanced

22) ZNF208

| Database | ID/URI |
| --- | --- |
| HGVS | NC_000019.10:g.21973116T>C |
| dbSNP | https://www.ncbi.nlm.nih.gov/snp/rs10425763 |
| ClinVar | — |
| UniProtKB | https://www.uniprot.org/uniprot/O43345#VAR_059903 |

| Response | #Patients |
| --- | --- |
| Yes | 12 (of 20) |
| No | 1 (of 12) |

Potential effect of variant on tumor sensitivity to ionizing radiation: Enhanced NSCLC-Specific Variants The following variants are predictive of radiotherapy response in the 84 non-small cell lung cancer (NSCLC) patients. The number and fraction of patients carrying the respective variant are split into those that do respond (CR and PR) and those that do not respond (SD and PD) to locoregional chemoradiation.

1) EP300

| Database | ID/URI |
| --- | --- |
| HGVS | NC_000022.11:g.41152004A>G |
| dbSNP | https://www.ncbi.nlm.nih.gov/snp/rs20551 |
| ClinVar | https://preview.ncbi.nlm.nih.gov/clinvar/variation/93736 |
| UniProtKB | https://www.uniprot.org/uniprot/Q09472#VAR_020425) |

| Response | #Patients |
| --- | --- |
| Yes | 23 (of 41) |
| No | 10 (of 43) |

Potential effect of variant on tumor sensitivity to ionizing radiation: Enhanced

| Database | ID/URI |
| --- | --- |
| HGVS | NC_000017.11:g.21416533C>T |
| dbSNP | https://www.ncbi.nlm.nih.gov/snp/rs72846670 |
| ClinVar | — |
| UniProtKB | — |

| Response | #Patients |
| --- | --- |
| Yes | 40 (of 41) |
| No | 33 (of 43) |

Potential effect of variant on tumor sensitivity to ionizing radiation: Enhanced

3) KCNJ12

| Database | ID/URI |
| --- | --- |
| HGVS | NC_000017.11:g.21416556G>A |
| dbSNP | https://www.ncbi.nlm.nih.gov/snp/rs73979902 |
| ClinVar | — |
| UniProtKB | — |

| Response | #Patients |
| --- | --- |
| Yes | 41 (of 41) |
| No | 35 (of 43) |

Potential effect of variant on tumor sensitivity to ionizing radiation: Enhanced

| Database | ID/URI |
| --- | --- |
| HGVS | NC_000010.11:g.129467401T>G |
| dbSNP | https://www.ncbi.nlm.nih.gov/snp/rs16906255 |
| ClinVar | — |
| UniProtKB | — |

| Response | #Patients |
| --- | --- |
| Yes | 12 (of 41) |
| No | 29 (of 43) |

Potential effect of variant on tumor sensitivity to ionizing radiation: Reduced

5) PMS2P9

| Database | ID/URI |
| --- | --- |
| HGVS | NC_000007.14:g.77040016_77040017delinsCA |
| dbSNP | https://www.ncbi.nlm.nih.gov/snp/rs73144285 |
| ClinVar | — |
| UniProtKB | — |

| Response | #Patients |
| --- | --- |
| Yes | 12 (of 41) |
| No | 25 (of 43) |

Potential effect of variant on tumor sensitivity to ionizing radiation: Reduced ii) GMB The mutational burden in a gene (GMB) has been calculated as the sum over all variants in that gene using the gene coordinates from Ensembl release 91. The following GMBs were found as predictive.

LUSC-Specific Genes

The GMB of the following genes is specifically predictive for radiotherapy response in LUSC patients: APOLD1, DDX11, GEN1, GPER1, MLH1, POLB, PRPF19

The statistical significance of association with radiotherapy response is higher for the GMB of these genes.

NSCLC-Specific Genes

The GMB of the following genes is specifically predictive for radiotherapy response in NSCLC—including LUSC—patients:

ANKRD30A, AR, BTK, GTF2H4, HEATR1, IKBKE, KAT6A, MAP3K1, NUDT19, PARP1, PTPRT, SLC9A4, TAF3, TDG

The statistical significance of association with radiotherapy response is higher for the GMB of these genes.

iii) TMB

The tumor mutational burden (TMB) has been calculated as the sum over all somatic variants in one of the following genomic territories 1. All genomic positions that are covered by the SureSelect® Human All Exon V6+COSMIC r2 kit (Design ID: S07604715) of Agilent® (65,724,874 bases)
2. All genomic positions that are covered by the NEOplus™ v2 RUO panel of NEO NEW ONCOLOGY® (1,150,757 bases)
3. All genomic positions that are covered by both above kits (1,118,543 bases)

Somatic variants were defined as those that could not be found in the human reference sequence (build 38 patch release 7), the Common dbSNP database (build 150), the 1000 Genomes Project (all phase 3 individuals) or the HapMap Project (phase 3 populations ASW, CEU, CHB, CHD, GIH, HCB, JPT, LWK, MEX, MKK, TSI, YRI) using the Filter Somatic Variants (WES)—Workflow of the QIAGEN® Biomedical Genomics Workbench 5.0.1.

Hence, the TMB is a natural number (including zero). To make a TMB value better comparable to a TMB value that has been calculated on a genomic territory of a different size, the TMB value can also be specified as the average number of somatic variants per mega base (1 MB) by dividing the TMB value by the size of the genomic territory and multiplying the resulting ratio by 1,000,000. In this case, the TMB is a positive rational number.

While this procedure exemplifies the calculation of the TMB, the TMB can also be calculated differently, e.g. considering only non-synonymous variants or using genomic territories different to those stated above.

Figure 4:
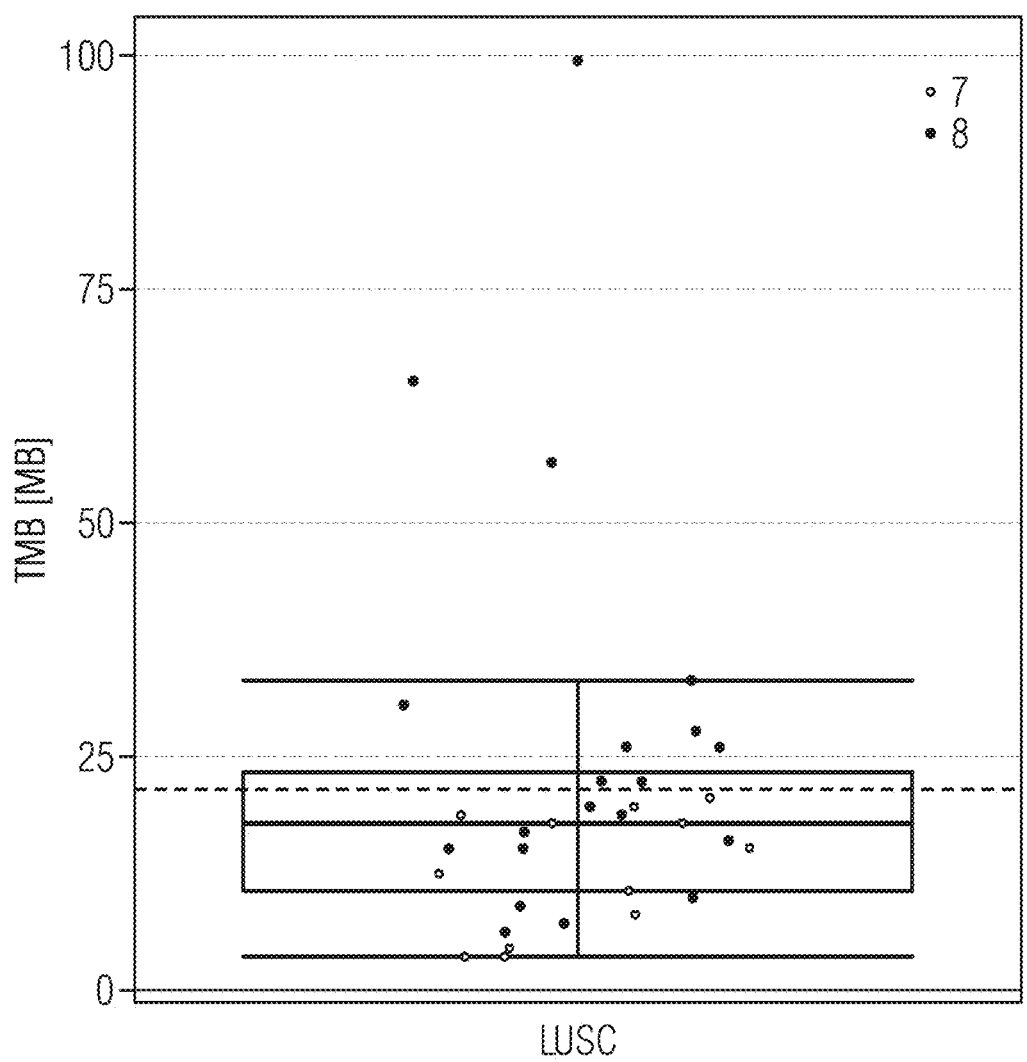
FIGS. 4 and 5 show results obtained in Example 1.

FIG. 4 shows the positive relationship between TMB and locoregional response to radiotherapy for all LUSC samples. A negative response is therein shown with reference number 7, and a positive response with reference number 8.

The TMB value of each LUSC sample is overlaid (and randomly scattered along the x-axis for better separation) and colored according to treatment response. The TMB value has been calculated within the genomic territory described in above 3. To separate responding from non-responding samples, a cutoff value can be used. In the box plot a possible TMB cutoff value of 21.45648 per MB is drawn as dashed line. This cutoff results in a prediction accuracy $$\frac{TP+TN}{(TP+TN+FP+FN)} \text{ of } 0.6875\left(\frac{10+12}{10+12+0+10}\right).$$

iv) Combination of SNV in MLH1 and TMB

As an exemplary value, also a radiotherapy success prediction has been made for a combination of the above SNV in MLH1 combined with TMB.

Figure 5:
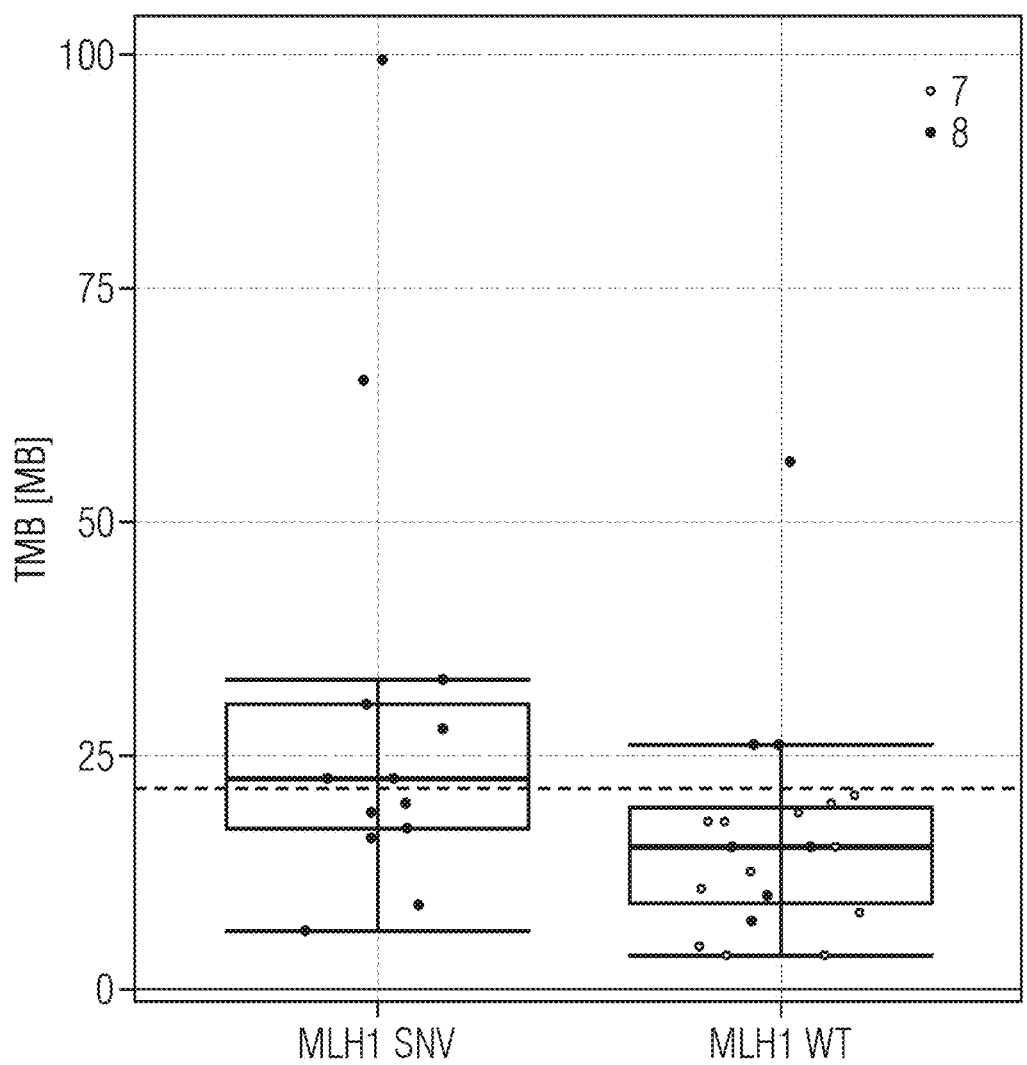

FIG. 5 shows the benefit when combining two features—TMB and single nucleotide variation (SNV) rs1799977 in MLH1—in the prediction of treatment response (WT=wild type or reference base). A negative response is therein again shown with reference number 7, and a positive response with reference number 8.

The TMB cutoff value of 21.45648 per MB is drawn as dashed line to make the two figures easier to compare. The accuracy is $$0.78125 \frac{13+12}{(13+12+0+7)}$$

when using the presence or absence of the MLH1 variant as predictor. The accuracy increases to $$0.875 \frac{16+12}{(16+12+0+4)}$$

when combining (OR logical operator) the presence or absence of the MLH1 variant with the TMB cutoff value. While this calculation exemplifies the combination of two features, the combination can also be done using a linear— e.g. logistic regression—or non-linear—e.g. Random Forest—statistical/machine learning method.

The following paragraphs contain the description of an exemplary further idea, which should not be interpreted in any way limiting the inventive concept: Generally, so-called "omics technologies" can allow measuring the following parameters on a genomic scale:
  variations in DNA (e.g. SNVs, MNVs, InDels, copy number, etc.),
  changes in epigenomic profiles (e.g. DNA methylations, DNA hydroxymethylations, histone modifications, etc.),
  changes in expression levels of RNAs and/or proteins, and the multitude of their modifications (e.g. RNA methylations, protein phosphorylations, etc.)

These variations, and features calculated from combinations of few and/or many variations, such as the tumor mutational burden (TMB), can be—positively or negatively—associated with radiotherapy success, and thus, may be leveraged in algorithms for predicting radiotherapy success. One challenge can be to prioritize those variations with respect to their impact on radiotherapy success and select those variations that are most relevant for a predictor of radiotherapy success.

Those variations could be preselected from the pool of variations in DNA and/or changes in epigenomic profiles and/or changes in RNA and/or protein expression levels (in the following termed biomolecule features) that reside in biomolecules that are known to be involved (as active component or its regulator) in the biological process of either DNA damage repair (e.g. MLH1, a tumor suppressor gene, taking a physiological role in DNA mismatch repair) and/or angiogenesis (e.g. EP300, a transcriptional coactivator, taking a physiological role in the stimulation of hypoxia-induced genes, e.g. VEGF).

Therefore, the biomolecule features can be selected in a way that
  they are, separately or (linearly or nonlinearly) combined, predictive of therapy success and/or
  they are also predictive of therapy success when using other treatment regimens of radiation and/or adjuvant therapy and/or
  they are also predictive of other subtypes of lung cancer, other cancer types (e.g. breast cancer) and different tumor stages).

The (pre)selection of the biomolecule features that are known to be involved in either DNA damage response or angiogenesis, which are biological processes that are fundamental to the tissue's response to ionizing radiation, may enable the extraction of the most relevant biomolecule features required for predicting radiotherapy success and/or locoregional recurrence.

The biomolecule features
  can be obtained from/measured in different biospecimens, such as tumor tissue, blood, urine, sputum, etc. and/or
  can be measured by any technology (e.g. PCR, sequencing, hybridization-based) and/or
  can be combined irrespective of being somatic (radiosensitivity/radioresistance of cancerous tissue) or germline (innate radiosensitivity).

While focusing on a defined set of biomolecules can reduce computation analysis time, ignoring features in biomolecules that are involved in biological processes not relevant to the tissue's response to ionizing radiation could facilitate to uncover relevant but otherwise not statistically significant features.

Since in this exemplary idea, the number of biomolecules to inspect may be reduced, clinicians may be able to interpret results faster. Furthermore, clinicians may be able to appraise the impact of relevant variations on radiotherapy success in the context of other biomolecules from the same biological process (e.g. by visualizing variations in the corresponding biological pathway).

SEQUENCE LISTING

The patent contains a lengthy sequence listing. A copy of the sequence listing is available in electronic form from the USPTO web site (https://seqdata.uspto.gov/docdetail?docId=US12553090B2). An electronic copy of the sequence listing will also be available from the USPTO upon request and payment of the fee set forth in 37 CFR 1.19(b)(3).

The invention claimed is:

1. A method of treating lung cancer in a patient in need thereof, wherein the lung cancer is lung squamous cell carcinoma, the method comprising:
   detecting a G allele at rs1799977 in the nucleotide sequence of MLH1 in a sample from the patient wherein the presence of said G allele is identified as predictive of enhanced response to radiochemotherapy; and
   administering radiochemotherapy to the patient.

2. The method of claim 1, further comprising detecting at least one additional allele in at least one gene selected from the group consisting of: BRCA2, DDX11, EPHA2, FLT1, GEN1, GRINA, HEATR1, MUTYH, NUDT1, PARP10, PRPF19, SETD2, and ZNF208.

3. The method of claim 2, wherein the at least one additional allele is selected from the group consisting of: rs1801406(A>G), rs1046456(C>T), rs3754334(G>A), rs7993418(G>A), rs16981869(A>G), rs72407975(del-TAA), rs67714660(C>G), rs56261297(C>T), rs2275685(C>T), rs2275687(T>C), rs1885533(A>G), rs1885534(G>A), rs1006456(T>C), rs2794763(T>C), rs3219472(C>T), rs1062492(C>T), rs11136344(T>C), rs11136345(G>A), rs2240045(C>T), rs4082155(G>A), and rs10425763(T>C).

4. The method of claim 1, wherein the sample is a blood sample.

* * * * *